United States Patent [19]

Trost et al.

[11] Patent Number: 5,198,657
[45] Date of Patent: Mar. 30, 1993

[54] INTEGRATED IMAGING AND RANGING LIDAR RECEIVER

[75] Inventors: Peter K. Trost, Carlsbad; Albert J. Lieber, Del Mar, both of Calif.

[73] Assignee: General Atomics, San Diego, Calif.

[21] Appl. No.: 831,403

[22] Filed: Feb. 5, 1992

[51] Int. Cl.⁵ .......................................... H01J 31/50
[52] U.S. Cl. .................... 250/214 VT; 356/5
[58] Field of Search ............. 250/560, 561, 213 VT; 356/5; 313/529, 537; 358/107

[56] References Cited

U.S. PATENT DOCUMENTS

| | | | |
|---|---|---|---|
| 4,603,250 | 7/1986 | Contini et al. | 250/213 |
| 4,727,427 | 2/1988 | Kline | 358/217 |
| 4,935,616 | 6/1990 | Scott | 250/213 |
| 5,029,009 | 7/1991 | Ulich et al. | 358/209 |
| 5,049,730 | 9/1991 | Loveland | 250/213 VT |

Primary Examiner—David C. Nelms
Attorney, Agent, or Firm—Fitch, Even, Tabin & Flannery

[57] ABSTRACT

An integrated LIDAR receiver includes a single detection element to provide both imaging and ranging functions. The single detection element includes an opaque photocathode, a microchannel plate (MCP) electron multiplier, and a phosphor coated anode covered with a metalized layer. The metalized layer on the phosphor anode allows electrons striking the anode to be detected as a prompt electrical current and used as a first output signal to provide ranging information. Visible light (photons) is also output from the anode in response to electrons striking the phosphor in the anode, and is used to provide an intensified image of a scene. The visible light may thereafter be detected by an imaging sensor, such as a CCD camera. The phosphor anode is biased at ground potential. A transimpedance amplifier is coupled to the metalized layer on the phosphor anode and, with the anode being at ground potential, operates with a virtual null input.

23 Claims, 5 Drawing Sheets

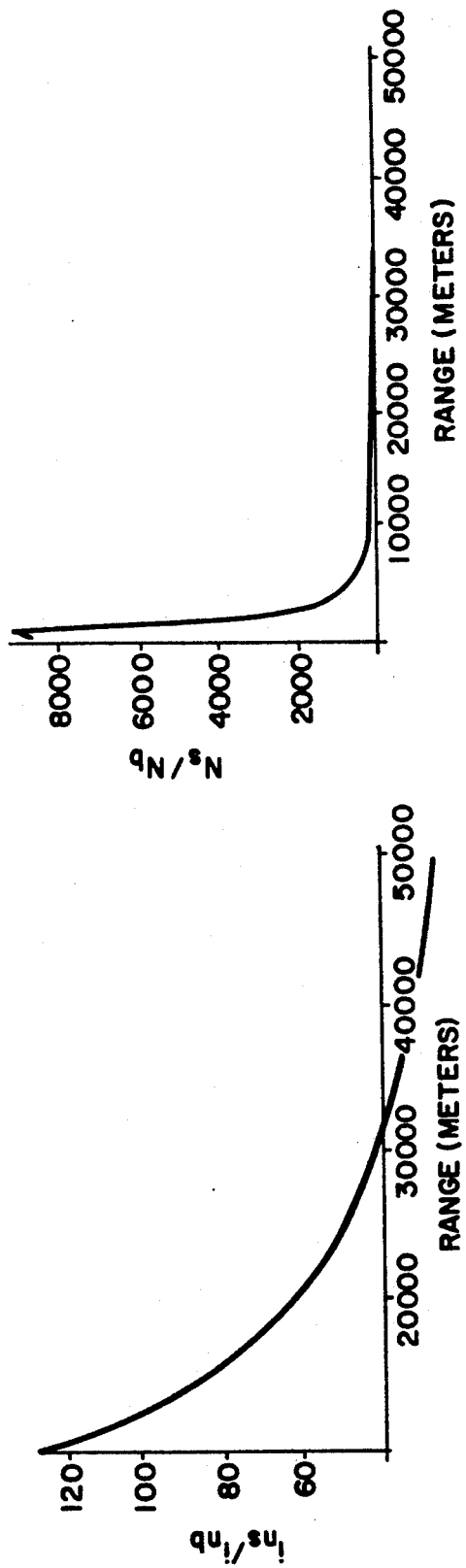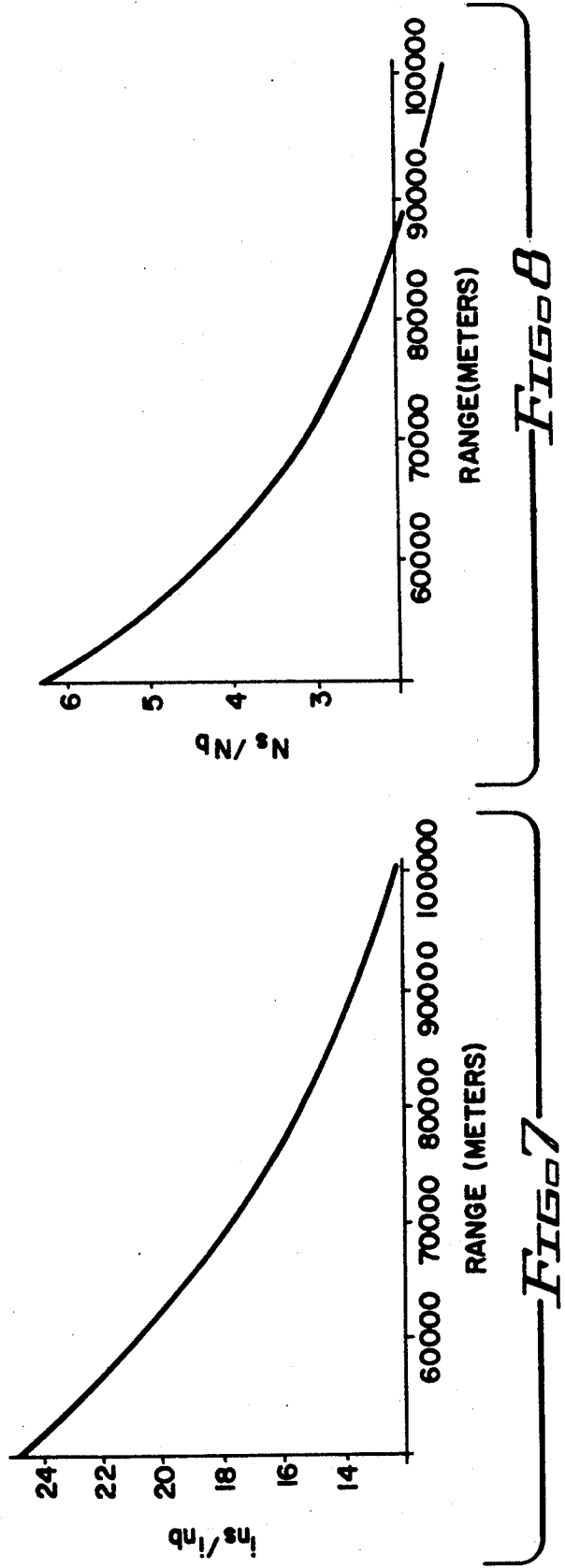
FIG. 7
FIG. 8

INTEGRATED IMAGING AND RANGING LIDAR RECEIVER

BACKGROUND OF THE INVENTION

The present invention relates to light imaging detection and ranging (LIDAR) systems, and more particularly to an integrated receiver utilized in a LIDAR system.

In a LIDAR system, a pulsed light source (such as a pulsed laser) emits a brief intense illuminating pulse of light at a known time, e.g., when triggered by a timing circuit. The pulse of light is directed at a target area, where a specific target, such as a rocket, is to be monitored. The emitted light pulse propagates at the speed of light (for the relevant medium through which it is traveling), and thus arrives at the target some finite time after its known transmission time. Upon striking the target, a portion of the energy associated with the incident light pulse is reflected from the target. The reflected light pulse also propagates at the applicable speed of light back to a receiver location, where an appropriate receiver is positioned to receive the reflected light energy. Thus, the light travels the same path going to the target as it does returning therefrom, and the propagation time is the same in both directions. Advantageously, the returned light pulse includes both ranging information (i.e., the round trip propagation time of the emitted light pulse) and imaging information (i.e., whatever image information is recoverable from the returned light pulse) for the target. Thus, through the use of appropriate processing circuits within the receiver, coupled to the same timing circuit used to trigger the light pulse, it is possible to extract both the ranging and imaging information from the returned light pulse.

If a perfect light detector were available, the extraction of the desired ranging and imaging information from the returned light pulse would be straightforward. That is, all that would be required would be to position such "perfect light detector" to detect the received light pulse, note the precise time at which the returned light pulse was received relative to when the light pulse was transmitted in order to determine the ranging information, and to process the detected light signal in order to provide the desired imaging information.

Unfortunately, perfect light detectors do not exist. All known light detectors use an appropriate conversion process to convert the incident photon energy to an appropriate output signal, usually an electrical signal, and/or to an amplified photon signal. That is, light detectors utilize a conversion process that converts incident photons (contained in the incident light signal) to electrons (contained in an electrical output signal). Further, an amplified (or intensified) photon signal is generally obtained only after first converting the photons to electrons, amplifying the electrons, and converting the amplified electrons back to photons.

Disadvantageously, conflicting requirements exist relative to the type of photon conversion process needed to provide the best ranging information and the best imaging information. For ranging, it is best to have a very sharp return pulse, indicative of the precise time a packet of photons is received at the light detector. Such sharp return pulse thus advantageously provides a precise indication of when the return pulse was received, and thus provides (when compared to the trigger time of when the initial pulse was transmitted) a very accurate indication of the round trip signal propagation time, and hence an accurate indication of the location of the target relative to the LIDAR transmitter/receiver location.

In order to detect such a sharp return pulse, useful for ranging purposes, a wide bandwidth is required. Unfortunately, imaging detectors do not have a sufficiently wide bandwidth for this function. That is, by the time the photons have been received and processed so as to provide an image signal in imaging detectors of the prior art, too much time has elapsed for the signal to be an accurate indicator of the photon receipt time.

In order to address the above conflicting photon detection requirements, it is known in the art to use a LIDAR receiver that has two different detectors, one for ranging and one for imaging. For such dual-detector LIDAR receiver to function, it is necessary to split the return light pulse (or return "beam"). One part of the split beam is directed to a first detector, typically an avalanche photodiode, used to measure the time-of-flight for range determination. The other part of the split beam is directed to a gated image intensifier (amplifier), which intensifies (amplifies) the returned image. The intensified image is then directed to an imaging device, typically a charge-coupled device (CCD) camera, whereat it is digitized for image processing.

The dual-detector LIDAR receiver requires two optical paths. Disadvantageously, the return beam power must be split or divided between the two paths, thereby reducing the available power in each path. Reduced power, in turn, lowers the overall range over which the LIDAR receiver may be used. What is needed, therefore, is a LIDAR receiver having increased range capabilities.

The use of two optical paths also requires the use of several optical components, e.g., a beamsplitter, optical filters and focusing optics, in each optical path. Disadvantageously, for airborne applications, such as military or civilian satellite use, or for use within other types of spacecraft, such optical components significantly add to the size, weight and cost of the LIDAR receiver. What is needed, therefore, is a LIDAR receiver that provides the desired imaging and ranging information without the need for separate optical paths, thereby allowing the size, weight and cost of the LIDAR receiver to be significantly reduced.

In dual-detector LIDAR receivers of the prior art, an image intensifier is used in one of the optical paths to bring the intensity of an image to a level that allows it to be sensed by an imaging detector, such as a CCD camera. See, e.g., U.S. Pat. No. 3,128,408 for a description of a basic image intensifier. The image intensifier may be a proximity focused image intensifier, which includes an opaque photocathode, a microchannel plate (MCP) electron multiplier, and a phosphor coated anode. The photocathode is electrically biased so as to accelerate electrons toward the MCP. The MCP has an electrical bias applied thereto that allows electrons flowing thereacross to be multiplied by a factor of 100 to 100,000. The phosphor coated anode and exit side of the MCP are biased so as to accelerate electrons toward the phosphor anode. When the electrons strike the phosphor, the phosphor is excited and photons are emitted, thereby providing an image—an intensified image—of the incoming optical signal. Unfortunately, the time delay between the instant the electrons strike the phosphor and the time that an image is processed by a suitable CCD camera is too long to allow the image to be used for ranging purposes. In other words, the CCD camera has too low of a bandwidth to provide useful ranging information.

In the other optical path of the dual-detector LIDAR, a silicon avalanche photodiode (APD) is used as the ranging detector. Advantageously, the ADP provides one of the highest sensitivities of known photodetectors. However, in order to achieve its highest gain, an ADP must be biased at levels that increase its "popcorn noise" and other noise, thereby limiting the effective sensitivity that the APD could otherwise achieve. Hence, what is needed is a photodetector that may be used to provide ranging detection within a LIDAR receiver that offers the same or better sensitivity as an APD detector, but without the limitations of the APD when used at the bias voltages required within a LIDAR receiver.

Thus, in summary, there is an unfilled need in the art for an imaging and ranging LIDAR receiver that offers higher sensitivity, lighter weight, more compact size, and lower cost than has heretofore been achievable. The present invention advantageously addresses these and other needs.

SUMMARY OF THE INVENTION

The present invention provides an integrated LIDAR receiver that includes a single detection element to provide both the imaging and ranging functions. The single detection element may be characterized as a modified image intensifier. Such modified image intensifier includes an opaque photocathode, a microchannel plate (MCP) electron multiplier, and a phosphor coated anode, similar to image intensifiers of the prior art. Unlike image intensifiers of the prior art, however, the phosphor anode is coated with a sufficiently thick metalized layer so as to allow a prompt anode current to be detected. Such anode current is used as a first output signal to provide ranging information. Advantageously, such anode current has a magnitude that varies as a function of the intensity of the incident light, thereby making it ideally suited for range-finding information. A second output signal is the visible light (photons) excited in the phosphor coated on the anode. Such light represents an intensified image of a scene, and may thereafter be detected by an imaging sensor, such as a CCD camera.

As indicated, an important aspect of the present invention is the use of a metalized film covering the phosphor anode. Metalized films have been used before to act as a reflector to assure that all of the photons are directed out of the backside of the anode to the imaging sensor. However, the present invention also uses the metalized film to detect a prompt anode current. Advantageously, the bias voltage appearing across the phosphor coated anode and metalized film is controlled so as to provide a desired division between those electrons that enter the phosphor anode (used for imaging purposes) and those that remain in the metalized layer (used for ranging purposes). In other words, unlike prior art image intensifiers, the present invention recognizes that not all of the electrons striking the anode need enter the phosphor so that their energy can be used to emit photons. Rather, the bias voltage used in conjunction with the anode is adjusted so that just enough electrons enter the phosphor to provide an optimum amount of light for the imaging sensor operation.

In accordance with another key aspect of the present invention, the image intensifier is biased so that the anode is at ground potential. Such biasing allows the metalized layer covering the phosphor anode to be connected to a transimpedance amplifier with a virtual null input. Current pulses developed in the metalized layer as a result of electrons striking the anode (which in turn result from incident light falling on the cathode) are converted to voltage pulses by the transimpedance amplifier. Such voltage pulses are then processed through a comparator for threshold detection. The threshold is set at an appropriate level for laser pulse detection, with the transition of the output of the threshold detector providing a precise timed signal from which ranging information can be derived.

Advantageously, because the integrated LIDAR receiver of the present invention includes only one detection element, only one optical path is needed. Hence, the optics normally used for the second optical path of dual-detector LIDAR receivers of the prior art are eliminated. Further, because the return beam is not split, the full power of the return pulse may be used for both ranging and imaging functions. Moreover, the elimination of the second optical path greatly reduces the number of components used within the system, thereby reducing its overall weight. The elimination of the second optical path also reduces the overall size and cost of the integrated LIDAR receiver, and significantly simplifies the manner in which the LIDAR receiver may be implemented.

In operation, the gain of the integrated LIDAR receiver advantageously increases, thereby improving range sensitivity, while the excess noise decreases, as the bias voltage applied between the cathode and anode are adjusted to increase the anode current. This is in contrast to the silicon APD, wherein the excess noise increases with internal gain. Hence, the integrated LIDAR receiver of the present invention advantageously provides a higher sensitivity for range detection than does the standard silicon APD.

One embodiment of the present invention may be characterized as an integrated LIDAR receiver. Such integrated LIDAR receiver includes: (1) an image intensifier having a cathode spaced apart from an anode, a microchannel plate (MCP) electron multiplier positioned intermediate the cathode and anode, the anode being made from a phosphor film that is deposited on a fiber optic substrate, and the phosphor film being coated with a metalized layer; (2) power supply means for selectively applying a first voltage potential between the MCP electron multiplier and the anode, with the anode being maintained at substantially ground (zero) potential, and for selectively applying a second voltage potential between the MCP electron multiplier and the cathode; (3) amplifier means coupled to the metalized layer of the anode for converting pulses of electrical current detected at the metalized layer to voltage pulses; and (4) threshold detection means for detecting when the voltage pulses generated by the amplifier means exceed a prescribed threshold level.

In the operation of such integrated LIDAR receiver, optical pulses striking the cathode of the image intensifier are manifest by the emission of electrons, which electrons are multiplied, and accelerated towards the anode. Statistically, a fraction of the electrons striking the anode pass through the metalized film into the phosphor film, causing photons to be emitted. Such photons thereafter are detectable through the fiber optic substrate, and the photons thus detected may thereafter be used to provide imaging information. The remaining fraction of the electrons striking the anode remain in the metalized layer and serve as a prompt electron current, or anode current. The prompt electron current is converted to a voltage pulse by the amplifier means. When the voltage pulse exceeds the prescribed threshold level, such voltage pulse is treated as a valid optical return pulse, and may thereafter be used to provide ranging information. In contrast, the electrons which enter the phosphor film conduct out on a longer time scale, and are thus less useful to provide ranging information.

In accordance with another embodiment, the present invention may be characterized as a LIDAR system that provides both ranging and imaging information relative to a target. Such LIDAR system includes the following elements:

(1) Means for generating and directing a pulse of radiant energy having a known wavelength towards the target in response to a trigger signal.

(2) An integrated LIDAR receiver for receiving radiant energy of the known wavelength reflected from the target. Such integrated LIDAR receiver includes: a cathode spaced apart from an anode, with electrons being emitted by the cathode in response to the cathode being impinged by radiant energy reflected from the target; and electron multiplier means positioned intermediate the cathode and anode. The electron multiplier means receives the electrons emitted from the cathode, and emits a larger number of electrons than thus received (i.e., it multiplies the number of electrons received). Further, the anode is made up of a first layer of a first selected material (e.g., phosphor) that is deposited on a fiber optic substrate, and a second layer of a second selected material (e.g., a metal, such as aluminum) that is placed over the first layer. A fraction of the electrons striking the anode pass through the second layer (the top layer) and cause photons to be emitted in the first layer. Such photons are thereafter detectable through the fiber optic substrate. Electrons striking the anode that do not pass through the second layer are detectable as a prompt anode current.

(3) Power supply means for selectively applying a first voltage potential between the MCP electron multiplier and the anode of the LIDAR receiver; and for selectively applying a second voltage potential between the MCP and the cathode. The second voltage potential causes electrons emitted by the cathode to be accelerated towards the MCP electron multiplier. The first voltage potential causes electrons emitted by the MCP electron multiplier to be accelerated towards the anode with a prescribed energy.

(4) Detection means for detecting the anode current and generating a return signal when the detected anode current exceeds a prescribed threshold level.

(5) Timing means for measuring the elapsed time between the trigger signal and the return signal.

(6) An image sensor coupled to the fiber optic substrate for generating an image signal responsive to photons impinging the image sensor through the fiber optic substrate.

(7) Processing means for generating the trigger signal, processing the image signal, and computing a range indication from the elapsed time measured by the timing means. Hence, both image and range information are provided relative to the target by detecting radiant energy of the known wavelength reflected from the target through the integrated LIDAR receiver.

The present invention may further be characterized as a method of determining both image and range information relative to a target using a single LIDAR detector. Such LIDAR detector includes at least a cathode spaced apart from an anode, with electrons being emitted by the cathode in response to the cathode being impinged by radiant energy reflected from the target. Further, the anode includes a phosphor layer covered with a metalized layer. Such method includes the steps of: (a) generating a pulse of radiant energy having a known wavelength and directing the radiant energy pulse at the target; (b) receiving radiant energy reflected from the target of the known wavelength at the cathode of the LIDAR receiver; (c) biasing the anode relative to the cathode such that electrons emitted from the cathode in response to the radiant energy received in step (b) are accelerated towards the anode with a prescribed energy, such prescribed energy being selected such that a fraction of the electrons striking the anode pass through the metalized layer into the phosphor layer and cause photons to be emitted, and a remaining fraction of the electrons striking the anode remain in the metalized layer and are detectable as an anode current; (d) detecting the photons generated in the phosphor layer and producing an image signal therefrom; (e) detecting the prompt anode current via the metalized layer; (f) measuring the elapsed time between the generation of the radiant energy pulse in step (a) and the detection of the prompt anode current in step (e); and (g) calculating the distance to the target based upon the elapsed time measurement of step (f).

It is thus a feature of the present invention to provide a LIDAR system or method that provides ranging and imaging information using a single detection element.

It is another feature of the invention to provide such a LIDAR system or method wherein such single detection element employs only a single optical path.

It is yet a further feature of the invention to provide such a LIDAR receiver that includes an image intensifier, having a cathode, multichannel plate electron magnifier, and phosphor anode deposited on an optical fiber substrate, with a metalized layer overlying the phosphor anode. The metalized layer advantageously provides a means for readily detecting a prompt anode current, which prompt anode current is generated simultaneously with the return of the optical return pulse.

It is an additional feature of the invention to provide such a dual-function LIDAR receiver—having a single optical path and providing both imaging and ranging functions—that is more compact, lightweight, and less power consuming than has heretofore been achievable, thereby allowing a LIDAR system employing such a LIDAR receiver to be used for airborne, space or other applications, where size, weight and power are of primary concern.

It is a further feature of the invention to provide a power supply for use with a LIDAR system that incorporates such a LIDAR receiver that allows the anode to be biased at ground potential, thereby facilitating the detection of the anode current using a transimpedance amplifier referenced at zero or ground potential.

It is an additional feature of the invention to provide a LIDAR receiver that provides improved sensitivity with respect to both imaging and ranging functions compared to the sensitivity of LIDAR receivers of the prior art.

It is yet another feature of the invention to provide a LIDAR receiver that does not use an avalanche photodiode detector, thereby avoiding the attendant problems associated with the use an avalanche photodiode detector (such as high dark current; excessive "popcorn noise", etc.).

BRIEF DESCRIPTION OF THE DRAWINGS

The above and other aspects, features and advantages of the present invention will be more apparent from the following more particular description thereof, presented in conjunction with the following drawings wherein:

FIG. 7 are plots that show the ratio of signal noise current to the noise current from background light for one particular application of the invention as described in Appendix A; and FIG. 8 are plots that illustrate the contrast (ratio of signal photons to background noise) for the proposed application of the invention, as described in Appendix A.

Figure 1:
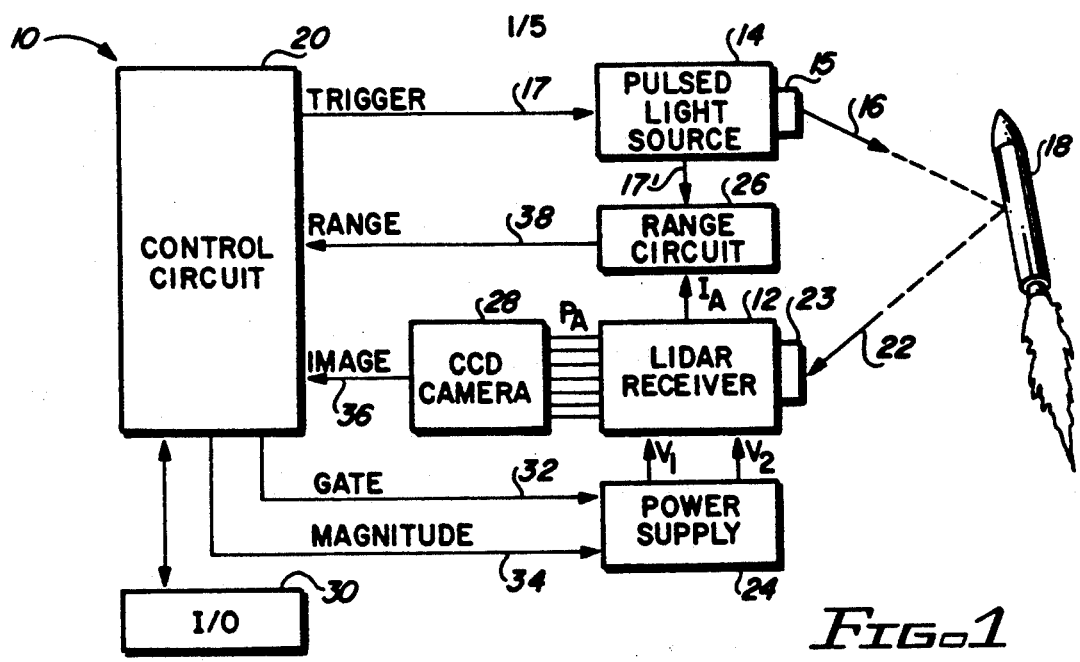
FIG. 1 is a block diagram of a LIDAR system that utilizes a LIDAR receiver made in accordance with the present invention.

Appendix A mathematically describes the operation of the invention, including the laser radar equation, the effects of system noise, and ranging accuracy, for a particular application of the invention (tracking a rocket or missile having a plume).

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Referring first to FIG. 1, there is shown a block diagram of a LIDAR system 10 that utilizes a LIDAR receiver 12 made in accordance with the present invention. The LIDAR system 10 includes a light source 14 that generates a pulse of intense light 16 in response to a trigger signal 17. The trigger signal 17 is generated by an appropriate control circuit 20 when it is desired to generate the pulse of light 16. Exactly coincident with the transmission of the light pulse 16, an auxiliary trigger signal 17' is generated. This trigger signal 17' provides a time reference from which ranging information may be determined, as explained below. The pulse of light 16 is directed at a suitable target 18, such as a moving rocket or missile, through an appropriate output optic system 15. A portion of the incident light pulse 16 is reflected from the target 18 back to the LIDAR receiver 12 as a reflected light pulse 22. The reflected light pulse 22 is received through a suitable optical channel 23 configured with appropriate lenses and other optical components, in conventional manner.

The LIDAR receiver 12 is biased by a power supply 24. As depicted in FIG. 1, at least two bias voltages, $V_1$ and $V_2$, are generated by the power supply 24 and provided to the LIDAR receiver 12. The use of two bias voltages is only exemplary, as any number of bias voltages may be utilized by the LIDAR receiver depending upon its internal construction and the number of multichannel plate (MCP) electron multipliers used therein. As is known in the art, the MCP electron multiplier is also biased with a voltage in order to accelerate the electrons therethrough. Such MCP bias voltage is not described herein but its presence is understood.

In most LIDAR systems, the power supply 24 is controlled by the control circuit 20 so as to provide the requisite bias voltages to the LIDAR receiver 12 only during a narrow window of time when a return light pulse is expected. In this manner, the control circuit 20 effectively turns on, or "gates on", the LIDAR receiver only at certain times. Thus, the control circuit 20 generates an appropriate gate signal 32 that controls when the bias voltages $V_1$ and/or $V_2$ are provided to the LIDAR receiver 12 from the power supply 24. It is noted that, depending upon the internal construction of the LIDAR receiver, it may be necessary to gate on only one of the bias voltages, e.g., $V_2$, in order to effectively control the LIDAR receiver. Further, it is noted that the control circuit 20 generates other control signals 34, as needed, in order to control the magnitude of the bias voltages applied to the LIDAR receiver 12. As will be evident from the description that follows, adjusting the magnitude of the bias voltages allows desired operating parameters, such as focusing and intensifying (amplifying) functions, of the LIDAR receiver to be readily controlled.

Assuming that the appropriate bias voltages $V_1$ and $V_2$ have been applied, the LIDAR receiver 12 generates two output signals in response to the receipt of a reflected light pulse 22. The generation of these two output signals is explained more fully below. In general, however, a first output signal is a light signal, $P_A$, representative of electrons at the anode with sufficient energy to cause the emission of photons at the anode of the LIDAR receiver 12. A second output signal is an electrical current, $I_A$, representative of electrons at the anode with insufficient energy to cause the emission of photons.

The first output signal, the light signal $P_A$, is optically coupled, e.g., through an optical fiber(s), to a suitable image sensor 28, such as a CCD camera. The CCD camera 28 includes a large array of small light sensors, with each small sensor in the array generating an appropriate electrical signal representative of the light intensity (number of photons) that fall thereon. In this manner, electrical signals are provided representative of the light intensity associated with each small sensor area, or pixel, of that portion of the target 18 from which the reflected light pulse 22 reflected. In combination, such signals thereby represent an image signal 36 that provides image information about the target. Such image signal 36 may be processed in conventional manner by the control circuit 20 for a desired purpose, e.g., to enhance the detected image using appropriate digital signal processing techniques, to store the image, to display the image, etc.

The second output signal, the electrical current $I_A$, is electrically coupled to a range circuit 26. The range circuit 26 includes an electronic timer circuit, or equivalent timing device, that is triggered or started by the trigger signal 17' generated coincident with the generation of the pulsed light source 14. The range circuit 26 also includes appropriate circuitry for testing the current $I_A$ to determine if it is truly representative of a valid return pulse 22, or is only representative of noise. If such testing determines that $I_A$ is representative of a valid return pulse, then its detection is used to stop the timer circuit that was started by the trigger signal 17'. Once stopped, such timer circuit thus provides a measure of the round-trip propagation time of the light pulse generated by the pulsed light source 14 to and from the target 18. Because the light pulse travels at a known velocity (the speed of light for the appropriate medium through which the light pulse propagates), such round-trip propagation time thus provides a range signal 38 from which ranging information can be calculated. For example, if the applicable speed of light is "c", and if the time measured in the timer circuit is "t", then the distance "d" or range to the target 18 is simply computed as $$d = 2tc.$$

Such distance can readily be computed by the control circuit 20 and used for a desired purpose, such as tracking the target 18, including estimating its trajectory; displaying the distance d on a suitable input/output (I/O) device 30, or the like.

The pulsed light source 14 may be realized using any suitable light source capable of generating a pulse of light with sufficient intensity to traverse the required path to and from the target 18. Typically, the pulsed light source 14 is realized using a laser that generates radiant energy at a precise wavelength. For example, for missile tracking purposes, a wavelength in the range of 5000 Å may be employed. Knowing the wavelength of the emitted light pulse 16 allows a suitable filter to be used as part of the optical channel 23 in the front end of the LIDAR receiver 12 to restrict the incoming reflected light pulse 22 to the same wavelength. Such filtering significantly minimizes background and other irrelevant wavelengths that are not of interest for the ranging and imaging functions of the LIDAR receiver.

It is to be understood that although the target depicted in FIG. 1 is a moving rocket or missile, the invention is not limited to use with such an airborne type of moving target. Indeed, the LIDAR system and LIDAR receiver of the present invention may be used for numerous applications, such as providing imaging and ranging information for a stationary target relative to a moving platform, or for providing ranging and imaging information for a moving target relative to a moving platform, or for airborne targets, or for underwater targets, or surface targets, and the like.

Figure 2:
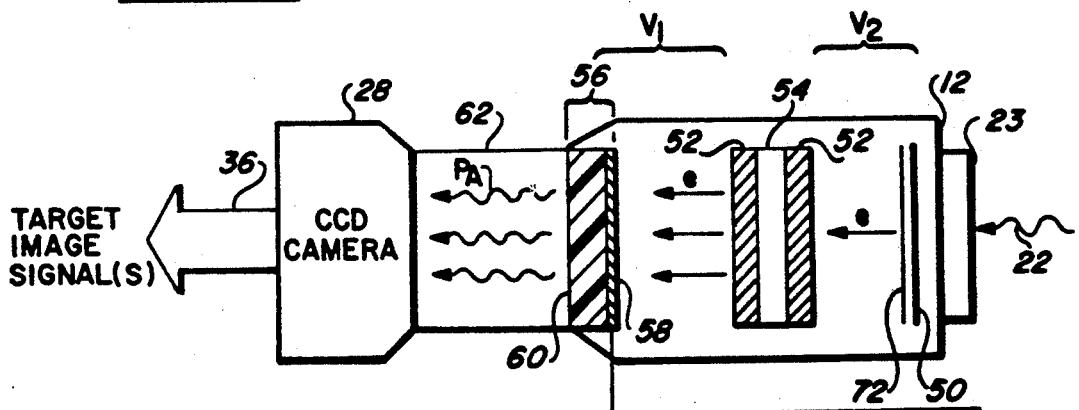
FIG. 2 is a block diagram of the LIDAR receiver and Range Circuits of the LIDAR system of FIG. 1.
Figure 2:
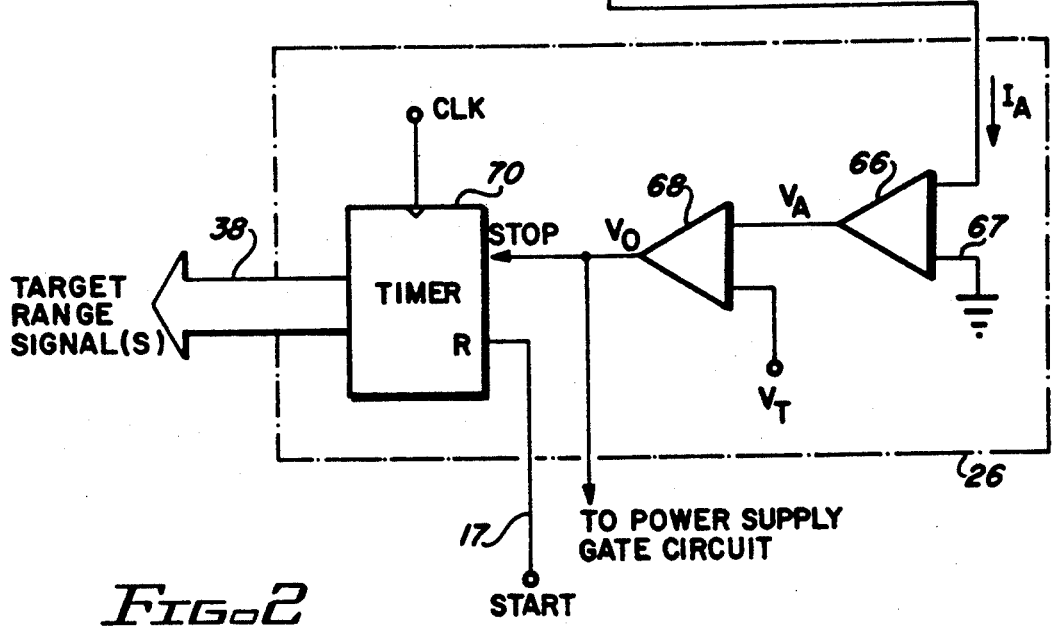

Turning next to FIG. 2, a block diagram of the LIDAR receiver 12 and range circuit 26 is illustrated. As shown in FIG. 2, the LIDAR receiver 12 includes a cathode 50, a multichannel plate (MCP) electron multiplier 54, and an anode 56, similar to a conventional image intensifier. An optical channel 23 is located at a front end (where the "front end" is the end through which the incoming light 22 is received) of the receiver 12. The optical channel 23 includes appropriate optical components for receiving the incoming light 22. Such optical components include, e.g., conventional lenses and filters used to receive the incoming light 22 of the wavelength of interest. Positioned at or near the end of the optical channel 23 is the cathode 50. The cathode 50 is made from an opaque material, such as S-20 (trialkali), and thus prevents any of the incoming light 22 from entering any further into the receiver 12. The cathode emits electrons "e" in proportion to the intensity of the incoming light 22 that strikes its front surface.

The MCP electron multiplier 54 is spaced downstream from the cathode 50, where "downstream" refers to the normal direction of electron or photon flow within the receiver 12, i.e., to the left as shown in FIG. 2 with the front end of the receiver 12 being on the right. The MCP 54 includes an array of millions of glass capillaries (channels) having diameters of 6–20 μm fused into a disk less than 1 mm thick. The inside walls of each channel are coated with a secondary electron emissive material having a specified resistivity. Both ends of each channel are covered with a thin film of metal that acts as an electrode. Each channel acts as an independent secondary electron multiplier. MCP electron multipliers are described in the art. See, e.g., Wiza, Joseph L., "Micro Channel Plate Detectors," *Nuclear Instruments and Methods*, Vol 162, pp. 587–601 (1979). The MCP 54 is electrically biased with the bias voltage $V_2$ so as to attract the electrons emitted from the cathode 50. The electrons that strike the MCP cause other electrons to be emitted from the MCP such that the number of electrons emitted from the MCP is much greater than the number of electrons that strike the MCP, as described above. In this manner, the MCP "multiplies" the number of electrons emitted from the cathode 50. (As mentioned above, there is also a third bias voltage that accelerates the electrons through the MCP.)

The multiplied electrons emitted from the MCP 54 are accelerated towards the anode 56 by the bias voltage $V_1$. The energy of the electrons that strike the anode 56 is a function of the bias potential through which the electrons have been accelerated. That is, the bias voltage $V_1$ controls the energy associated with electrons that strike the anode. The anode 56 includes a layer of phosphor 60, or equivalent material, that releases photons, $P_A$, in proportion to the energy of the electrons that enter the phosphor. The phosphor layer 60 is deposited on an fiber optic substrate 62, much like paint is brushed or sprayed onto a surface. Thus, as electrons trigger the release of photons $P_A$ in the phosphor layer 60, such photons are detectable through the fiber optic substrate 62, e.g., by CCD camera 28. The CCD camera, in turn, converts the detected photons to appropriate electrical signals that represent target image signals that may be appropriately processed by the control circuit 20, or equivalent processor.

It is noted that the use of CCD camera 28 as a photon sensor to detect the photons $P_A$ is only exemplary. Any suitable sensor or detector that is optically coupled to the back of the fiber optic substrate 62 (where "back" refers to the phosphor layer side of the anode 56) could be used for such photon detection purpose.

As described in the preceding paragraphs, the LIDAR receiver 12 performs the function of an image intensifier. That is, incoming light 22 is converted to electrons, the number of electrons are amplified (multiplied), and then accelerated towards a phosphor surface (the anode), where the energy of the accelerated electrons is converted back to light (photons). However, because the number of electrons are multiplied and the energy associated with the electrons is increased, the image (as defined by the photons created at the anode) that is detectable at the anode (through the fiber optic substrate) is greatly intensified over that which would be available without such electron multiplication and increased electron energy.

Image intensifiers are, of course, known in the art. The present LIDAR receiver 12, however, is more than an image intensifier. While it performs the image intensifying function as described above, it also provides a target range signal. The target range signal is a prompt anode current that is detectable via a metalized layer 58 placed over the top of the phosphor layer 60. The metalized layer serves two primary functions: (1) it reflects the photons that are generated in the phosphor layer 60 towards the back of the fiber optic substrate 62, where they can be detected, as in prior art image intensifiers; and (2) it captures a fraction of the electrons striking the anode to provide a prompt anode current $I_A$. (The number of electrons that are captured by the metalized layer is determined statistically as a function of the energy of the electrons and the thickness of the metalized layer.) Advantageously, the prompt anode current $I_A$ appears coincident with the electrons striking the anode. The electrons strike the anode, in turn, given the relatively short dimensions of the LIDAR receiver, substantially coincident with the receipt of a pulse of light 22 at the cathode 50 of the LIDAR receiver. Thus, at substantially the same instant of time that a pulse of light 22 enters the LIDAR receiver 12, a pulse of anode current $I_A$ is generated. Hence, the above current may be referred to as a "prompt" anode current.

The anode current $I_A$ is detected in a transimpedance amplifier 66. A transimpedance amplifier is an amplifier that converts an input current to an output voltage in accordance with a prescribed gain factor. Such a transimpedance amplifier may be realized using any of a number of commercially available operational amplifiers, or equivalent amplifier circuits. Thus, as shown in FIG. 2, the anode current $I_A$ is converted to an anode voltage $V_A$ by the transimpedance amplifier 66, where $V_A = GI_A$, and G is the gain (amplification factor) of the transimpedance amplifier 66. A representative transimpedance amplifier that could be used with the invention is the LeCroy TRA 1000 available from LeCroy Corporation of Chestnut Ridge, N.Y.

An important feature of the LIDAR receiver 12 of the present invention is that the anode 56 is biased at ground (zero) potential relative to the other bias voltages provided by the power supply 24. Such biasing allows the anode current $I_A$ to be readily detected by the transimpedance amplifier 66. That is, the transimpedance amplifier 66 has two input terminals, as shown in FIG. 2. The internal circuits of the amplifier 66 compare the input currents appearing at these two input terminals in a differential manner such that any slight variation in the input current to one input terminal compared to the input current to the other is converted to an amplified change in the output voltage. Thus, by being able to tie one input terminal 67 directly to ground potential, as shown in FIG. 2, the anode current $I_A$ can be measured relative to a virtual null (zero) input, thus making the amplifier 66 sensitive to any change in $I_A$ about the null input. Typically, a feedback resistor is used with the transimpedance amplifier (not shown in FIG. 2).

Still referring to FIG. 2, the anode voltage $V_A$, generated in response to the anode current $I_A$, is directed to a threshold amplifier 68 where it is compared to a threshold reference voltage $V_T$. If the anode voltage $V_A$ exceeds the threshold reference voltage $V_T$, then the output voltage $V_O$ of the threshold amplifier 68 assumes one of two possible values, e.g., a high value. If the anode voltage $V_A$ does not exceed the threshold reference voltage $V_T$, then the output voltage $V_O$ of the threshold amplifier 68 assumes the other possible value, e.g., a low voltage. Thus, so long as an anode current $I_A$ is present of a sufficient magnitude to cause the resulting anode voltage $V_A$ to exceed the threshold reference $V_T$, the output of the threshold amplifier 68 assumes a prescribed state, e.g., a high voltage. Otherwise, the output of the threshold amplifier 68 assumes the other state, e.g., a low voltage. In other words, when a pulse of anode current $I_A$ is generated as a result of a pulse of incident light 22 falling upon the cathode 50, such pulse (if of sufficient magnitude) causes the threshold amplifier 68 to change states, e.g., to produce a voltage pulse. Such voltage pulse is used to stop a timer circuit 70, which timer circuit 70 is started coincident with the generation of the light pulse 16 that is directed at the target 18 (see FIG. 1).

The timer circuit 70 may be realized using a simple counter circuit, numerous types of which are commercially available, configured to count the pulses, or periods, of a suitable clock signal, identified in FIG. 2 as "CLK". The clock signal is selected to be a suitably high frequency, e.g., 150 MHz, so as to allow a time resolution of just a few nanoseconds to be obtained based on the count held in the timer circuit, allowing a linear resolution of approximately 1 meter. The clock signal may be derived from a conventional oscillator (not shown in FIG. 2), which oscillator may comprise one of the circuits of the control circuit 20 (FIG. 1).

Figure 3A:
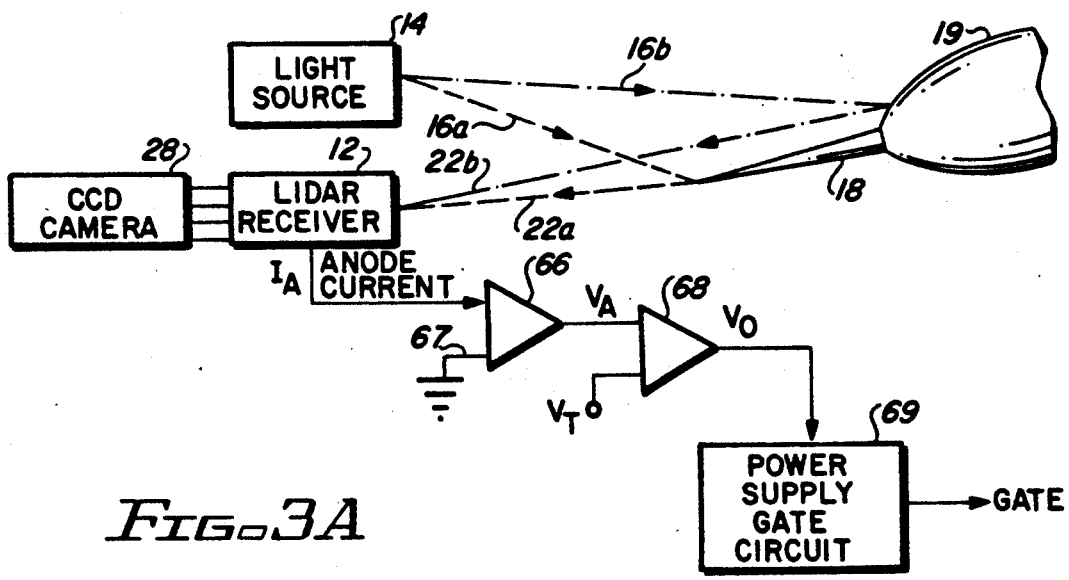
FIG. 3A is a block diagram of a portion of a LIDAR system illustrating the use of a power supply gate circuit to shutdown the LIDAR power supply in order to effectively discriminate between a return pulse from a target and its background.

As seen in FIG. 2, the output voltage $V_O$ of the threshold detector 68 may also be used to trigger a power supply gate circuit 69 as shown in FIG. 3A. Such a gate circuit 69 offers the capability of allowing the LIDAR system 10 to effectively discriminate between a target and the target's background, particularly where the target's background is such that it might also reflect a return pulse to the LIDAR receiver. Thus, as seen in FIG. 3A, a target 18 (which may be a missile or rocket) includes a plume 19. When the target 18 is coming towards the LIDAR system 10, a pulse of light 16a from the LIDAR system's light source 14 strikes the target, and is reflected back to the LIDAR receiver as a return pulse 22a. A pulse of light 16b from the light source 14 may also strike the plume 19 of the target 18, causing a return pulse 22b to return to the LIDAR receiver 12. If the LIDAR receiver 12 processes both the target return pulse 22a and the background return pulse 22b, it may be difficult to separate the target from its background in the image information that is detected.

Advantageously, by using the circuitry shown in FIG. 3A, the invention is able to effectively discriminate between the target and its background. As depicted in FIG. 3A, the target is coming towards the LIDAR system. Thus, as the target moves towards the LIDAR system, the target 18 is closer to the LIDAR receiver than is its background. Hence, the return pulse 22a from the target arrives at the receiver 12 sooner than does the return pulse 22b from the background. That is, if the target is a missile having a length of 5 meters, for example, then the return pulse 22a from the front tip of the target will arrive at the LIDAR receiver 12 approximately 33 nanoseconds before the return pulse 22b. Hence, in accordance with the present invention, the leading edge of the return pulse 22a is immediately processed and is used to trigger the power supply gate circuit 69. The power supply gate circuit 69, in turn, gates the LIDAR receiver OFF (switches the bias voltage $V_1$ and/or $V_2$) so that it no longer detects any incoming pulses. Thus, when the return pulse 22b arrives at the LIDAR receiver 12, it is not received because the LIDAR receiver has been gated OFF.

Figure 3B:
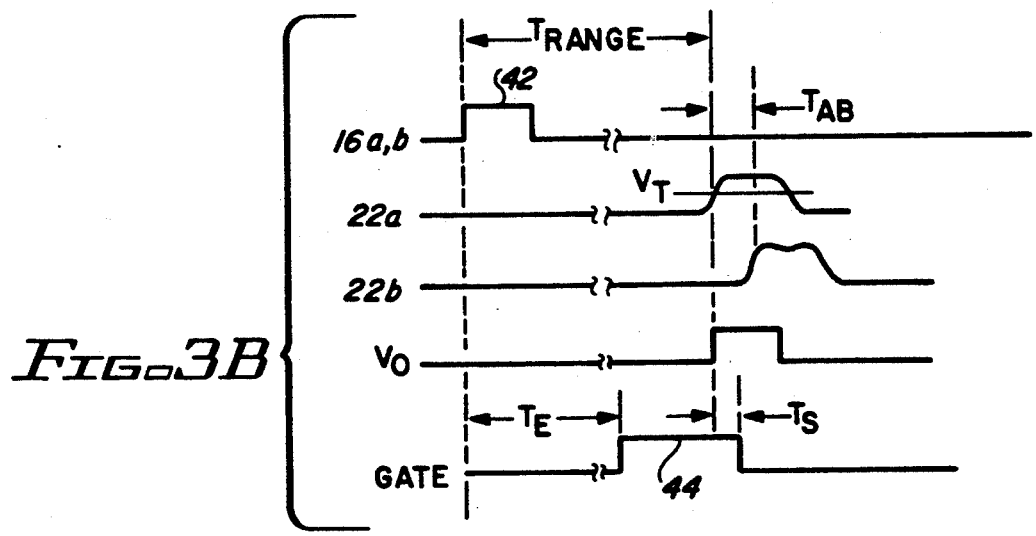
FIG. 3B is a timing diagram illustrating the operation of the LIDAR system shown in FIG. 3A.

To better illustrate the operation of the LIDAR receiver 12 as it discriminates between a target and the target's background, consider the timing diagram shown in FIG. 3B. In FIG. 3B, the light pulse 16a or 16b from the pulsed light source 14 is represented as a pulse 42. After the pulse 42 travels to and from the target 18, a return pulse 22a is received. The time between the leading edge of the transmitted pulse 16a and the leading edge of the return pulse 22a represents the round trip propagation time of the pulse, $T_{RANGE}$. It is from this time $T_{RANGE}$ that the ranging information for the LIDAR system is obtained. In order to filter out the background return signal 22b, which follows the target return signal by only tens of nanoseconds, the return pulse 22a is amplified by the transimpedance amplifier 66 and compared to a threshold $V_T$ in a threshold detection circuit 68. The leading edge of the output signal, $V_0$, of the threshold detection circuit 68 is applied to the power supply gate circuit 69.

The power supply gate circuit 69 provides a gate signal 44 that turns ON the LIDAR receiver 12 during a time when a return pulse is anticipated. Typically, this will be a time $T_E$ after the generation of the pulse 42. For an anticipated target range of 3-5 km, for example, $T_E$ may be on the order of 30-100 microseconds. As soon as the leading edge of $V_0$ goes high, however, e.g., within 5-10 nanoseconds thereafter, the power supply gate circuit causes the gate signal 44 to go low, thereby turning OFF the LIDAR receiver, e.g., by biasing the photocathode 50 so that it does not respond to photons falling thereon. Thus, by the time the leading edge of the background return pulse 22b is received at the LIDAR receiver 12, which is a time $T_S$ after the leading edge of the return pulse 22a has been received, the LIDAR receiver 12 has been turned OFF, thereby blocking the receipt of the return pulse 22b. Hence, in this manner, the image detected at the CCD camera 28 is due solely to the photons in the target return pulse 22a, not the photons in the background return pulse 22b.

Figure 3C:
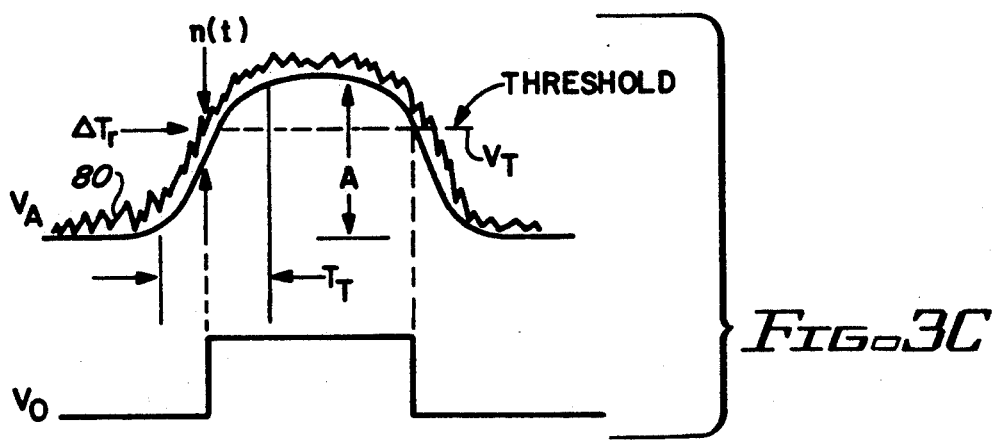
FIG. 3C illustrates a return pulse as processed by the range circuits of FIG. 1, and defines some of the parameters that influence range accuracy.

To further illustrate the operation of the range circuit 26, reference is next made to both FIGS. 2 and 3C. FIG. 3C shows a timing waveform diagram that includes a return pulse as processed by the range circuit 26. The return pulse shown in FIG. 3C is assumed to be the anode voltage pulse $V_A$ obtained from the transimpedance amplifier 66. However, because such pulse is directly derived from the anode current pulse $I_A$, which current pulse, in turn, is related directly to the return light pulse 22, the pulse shown in FIG. 3C is directly representative of the return light pulse 22. It is assumed that the pulse $V_A$ has "noise" riding thereon, which noise is represented symbolically as a jagged line 80. The pulse has a finite rise time $T_T$ associated therewith. As the voltage level of the pulse rises from its initial ground (zero volts) condition up to its peak value, "A", it crosses the threshold voltage $V_T$. As soon as the voltage $V_A$ exceeds $V_T$, the output voltage, $V_0$, of the threshold detector 68 changes state (going, e.g., from a low voltage to a high voltage). So long as the anode voltage $V_A$ remains above the threshold reference value $V_T$, the output state of the threshold detector 68 does not change. As soon as the anode voltage $V_A$ goes below the threshold level $V_T$, the state of the threshold detector 68 changes back to its initial state (going, e.g., from a high voltage to a low voltage).

The leading edge of the pulse $V_0$ is used to stop the operation of the timer circuit 70. (As explained above in connection with FIGS. 3A and 3B, this leading edge of the pulse $V_0$, or an equivalent leading edge, such as the leading edge of the anode current $I_A$, may also be used, in some embodiments of the invention, to trigger the power supply gate circuit 69.) The timer circuit 70 is started at a time coincident with the generation of the original light pulse 16 directed at the target 18. Thus, during the entire time that the light pulse 16 is propagating towards the target 18, and during the time that the reflected return pulse 22 is returning from the target 18, the counter 70 is counting each cycle of the clock signal. Thus, when the timer is stopped by the leading edge of the pulse $V_0$, the counter contains a count of the time $T_{RANGE}$ (FIG. 3B), which time provides an accurate measure of the elapsed time (number of clock periods), and hence the distance, to the target as explained above.

Advantageously, the present invention provides a convenient mechanism for controlling the number of electrons received at the anode that do not emit photons, and the number of electrons received at the anode that are captured in the metallized layer and do not emit photons, which electrons cause the prompt anode current $I_A$ to be generated. Such mechanism comprises controlling the number of electrons that are allowed to pass through the metalized layer 58 into the phosphor layer 60. Such number is determined statistically as a function of at least two variables. The first is the thickness of the metalized layer 58. The second is the energy of the electrons that strike the metalized layer.

The thickness of the metalized layer is a physical parameter. If the metalized layer is extremely thin, most electrons will pass therethrough into the phosphor layer. If the metalized layer is extremely thick, few electrons will be able to pass therethrough into the phosphor layer. In general, the physical thickness of the metalized layer is selected as a tradeoff between providing a good reflective surface for the photons and allowing a sufficient number of electrons to pass therethrough. Such physical thickness may be selected in accordance with known design factors used in the image intensifier art.

The energy of the electrons that strike the metalized layer is a function of the bias voltage $V_1$ applied between the MCP 54 and the anode 56. The higher the bias voltage, the more the electrons are accelerated as they leave the MCP, and the more energy they have when they strike the anode. The bias voltage $V_1$, for example, may be around 5000 volts (5 kV), thereby placing the MCP at 5 kV above the anode (which is maintained at ground). Such a biasing scheme would thereby accelerate the electrons emitted by the MCP to an energy of 5000 electron volts (5 KeV) when they strike the anode.

As the energized electrons enter the metalized layer 58, they begin, on average, to lose their energy. If the layer 58 is sufficiently thick, they lose all their energy, and do not enter the phosphor layer 60. For purposes of the present invention, it is desired that the electrons have an appropriate energy as they strike the metalized layer so that at least a statistically determined fraction of the electrons will make it into the phosphor layer 60 where they can cause photons to be emitted, while others of the electrons will statistically remain in the metalized layer where they can contribute to the prompt anode current $I_A$. To this end, it is convenient to refer to the thickness of the metalized and phosphor layers in terms of kV, rather than in terms of a physical dimension. For example, if the thickness of the metalized layer is 2 kV, and if the bias voltage $V_1$ is 5 kV then the energy of the electrons entering phosphor layer is 3 kV. Advantageously, the bias voltage $V_1$ can be adjusted, as required, in order to control the number of electrons that enter the phosphor layer 60 so as to cause just the right number of photons to be emitted to provide an optimum amount of light for operation of the CCD camera 28 (or equivalent photon sensor). Thus, the present invention recognizes that not all of the electrons that strike the anode need to be of sufficient energy to cause the emission of photons, as is the case with image intensifiers of the prior art. For a bias voltage $V_1$ of 5 kV, the thickness of the metalized layer 58, expressed in terms of volts, can thus vary from 0 to 5 kV. Typically, the thickness will range from 0–3 kV, so that anywhere from 5 to 2 kV of electron energy is released in the phosphor layer 60.

The metalized layer 58 may be realized from aluminum (Al), or other metals having similar properties (e.g., good optical reflective properties, and a low Z), such as beryllium (Be).

Still referring to FIG. 2, it is preferred that an undercoating 72 also be employed on the underneath (back) side of the cathode 50. The undercoating is used to improve the conductivity of the cathode, and the undercoating material should thus be a good electrical conductor. A preferred material for the undercoating is nickel (Ni), but other conductive materials, such as aluminum (Al) or inconel, could also be used.

An example of a LIDAR receiver 12 made in accordance with the present invention includes a modern low-resistance photocathode 50 made from S-20 (trialkali) having a diameter of 12 mm. A suitable undercoat of Ni is placed on the back side of the photocathode 50. Such a small 12 mm diameter intensifier inherently has less photocathode strip resistance than would a larger diameter tube, thereby improving its gating characteristics (i.e., the ability to quickly gate the device ON or OFF). Gating is normally achieved by switching the polarity of the bias voltage $V_2$ from, e.g., −200 V (ON) to +50 V (OFF), where the voltage is measured relative to the MCP electron intensifier 54. Some applications require very fast gating, e.g., less than 10 nanoseconds, while other applications (such as tracking a rocket or missile) may utilize a longer gating period, e.g., 30–100 nanoseconds, or more. Tens of nanosecond gating is achievable using a conventional photocathode without an undercoating.

Continuing with the example of the LIDAR receiver, the MCP electron multiplier 52 is positioned approximately 0.2 cm from the photocathode 50, and is realized using a Micro Channel Plate commercially available from Hamamatsu Photonics K. K. of Hamamatsu City, Japan. Such an MCP device is commonly used in image intensifiers of the prior art. The anode 56 is positioned approximately 1.2 mm from the MCP 54, and includes a fiber optic substrate on which a coating of phosphor is deposited. The phosphor, in turn, is coated with a layer of Al. The layer of Al may be readily applied to the phosphor wafer, as well as the undercoating layer of Ni applied to the GaAs cathode, using vapor deposition techniques known in the art. The thicknesses of the layers are the same as are known and practiced in the image intensifier art. The bias voltage $V_1$ is initially set at approximately 5 kV, so that for the given physical thickness of the Al layer, the Al layer has an effective thickness of about 3 kV. A suitable electrical connection is made to the Al layer to connect it to the transimpedance amplifier 66. The fiber optic substrate is made from a fiber optic bundle, made from fiber optic rods of approximately 6 μm diameter and 1.0 cm length. Such fiber optic rods are commercially available from numerous sources, such as Collimated Holes, Inc. of Campbell, Calif. An appropriate CCD camera 28, such as the TH7883, commercially available from Thompson Components and Tubes, Corp., of Totowa, N. J., is then optically coupled to the end of the fiber optic bundle so as to receive any photons emitted in the phosphor anode. Again, such CCD cameras are commonly used with image intensifiers of the prior art.

As thus described, it is seen that the LIDAR receiver 12 may be readily assembled and manufactured from components commonly available in the intensifier art, and by using manufacturing techniques also known in the art. Thus, no new components or assembly skills are needed. Advantageously, such LIDAR receiver employs only a single optical path and does not require the use of the avalanche photodiode (APD) as a detector element. By avoiding the use of the APD, numerous problems are avoided, and several advantages are realized, resulting in overall improved sensitivity. For example, by using a dual-microchannel plate the noise image intensifier function of the receiver is photon limited, thereby providing a significantly superior sensitivity. (Note, any number of MCP's may be stacked, connecting the MCP's in series so that additional gain is realized. When two MCP's are thus stacked, a "dual microchannel plate" results.) Thus, if the scene is background limited, i.e., if the dominant noise is from the target itself (e.g., the plume of a rocket) or the target's background (e.g., the sun), the LIDAR receiver of the present invention can provide a usable signal before a noisier less-sensitive detector can. Further, since target illumination must ultimately come from the transmitter (the light source 14), the superior receiver sensitivity ensures maximum utilization of the source illumination, thereby minimizing transmitter mass and power.

Moreover, because the APD has a significantly higher dark current (the current present with the blocking of all input light) than does the LIDAR receiver of the present invention, the resultant noise current from the present LIDAR receiver is less than 0.5% compared to that of the APD. (It is the dark current of the APD, which prevents it from photon limiting.) Because there is a smaller excess noise factor with the LIDAR receiver of the present invention, there is thus an improved signal-to-noise ratio, meaning, that there is a greater certainty than an output voltage $V_A$ of a prescribed magnitude will result. This allows a margin in setting the threshold level $V_T$ to ensure that even weak signals can be detected.

Still further, it is noted that as the bias voltage of an APD is increased (which controls the gain), microplasmas are produced in the semiconductor bulk. Such microplasmas result in system signals that appear suddenly, just as popcorn suddenly pops, and may even appear as valid signal returns. When such "popcorn noise" does appear, the false alarm rate of the APD-based system thus significantly increases. In contrast, the LIDAR receiver described herein, by avoiding the use of APD's, provides an optimized system that does not produce "popcorn noise" regardless of gain. Moreover, as the gain of the intensifier is pushed to its limit, the response of the dual MCP 54 actually becomes more Gaussian, resulting in a still lower excess-noise factor and, therefore, improved sensitivity.

Figure 4:
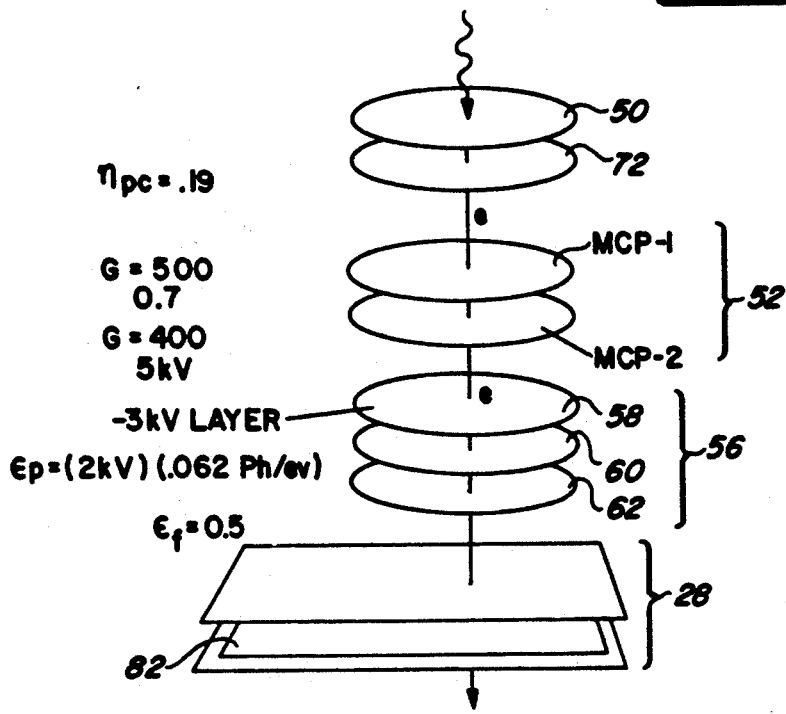
FIG. 4 schematically depicts a LIDAR receiver made in accordance with the present invention, and illustrates the various bias voltages that are applied thereto.

The photon gain that is achievable using a LIDAR receiver 12 as described above is best described with reference to FIG. 4. FIG. 4 schematically depicts the elements of a dual-plate image intensifier as used in the LIDAR receiver 12. Thus, schematically shown in FIG. 4 is the photocathode 50, the cathode undercoat 72, the two plates of the MCP electron intensifier 52, (referred to as MCP-1 and MCP-2), the metalized layer 58 and phosphor layer 60 of the anode 56, the fiber optic substrate 62, and the CCD camera 28, including a CCD array 82. The photon gain is the product of the photocathode's quantum efficiency, $\eta_{pc}$, electron gain, $G_e$, phosphor conversion efficiency, $\epsilon_p$, and the light coupling efficiency into the fiberoptic output, $\epsilon_f$. The phosphor conversion efficiency is 0.062 photons/(electron/eV). A photoelectron mapping efficiency into the channelplate pores is typically 0.7 and may be folded into the effective gain of the first and second microchannel plates MCP-1 and MCP-2. After cascading down the pores of the microchannel plates, the electrons are accelerated to 5000 eV in the region between the MCP 54 and the phosphor anode in order to be mapped immediately onto the phosphor with a minimum of lateral drift and resolution loss. Since the photocathode 50 is kept in close proximity to the MCP 54 in order to maintain the desired resolution, such configuration is known in the image intensifier art as a proximity-focused channelplate intensifier (PFCIT). In a representative arrangement, the electrons emerging from the MCP 54 leave approximately 3 kV in the Al reflective layer 58 overlaying the phosphor layer 60, and therefore deposit roughly 2 kV in the phosphor layer (which may be properly referred to as a phosphor screen). Thus, the effective phosphor conversion $\epsilon_p$ is (2 kV) $\times$ (0.062 photons/electron/eV) = 124 photons/electron. The fiberoptic substrate (or fiberoptic window, as it may be called because it provides a "view" of the phosphor screen) has a typical numerical aperture of $\pm 45°$, resulting in an effective coupling of a Lambertian emitting phosphor to the fiberoptic faceplate of approximately 50%, making $\epsilon_f = 0.5$. Thus, the overall image intensifier's photon gain, $G_p$, is $$G_p = \eta_{pc} \epsilon_p \epsilon_f G_e,$$

where $G_e$ is electron gain of the MCP. Assuming a photocathode quantum efficiency, $\eta_{pc}$, of 0.19, then $$G_p = 11.8 G_e.$$

Figure 5:
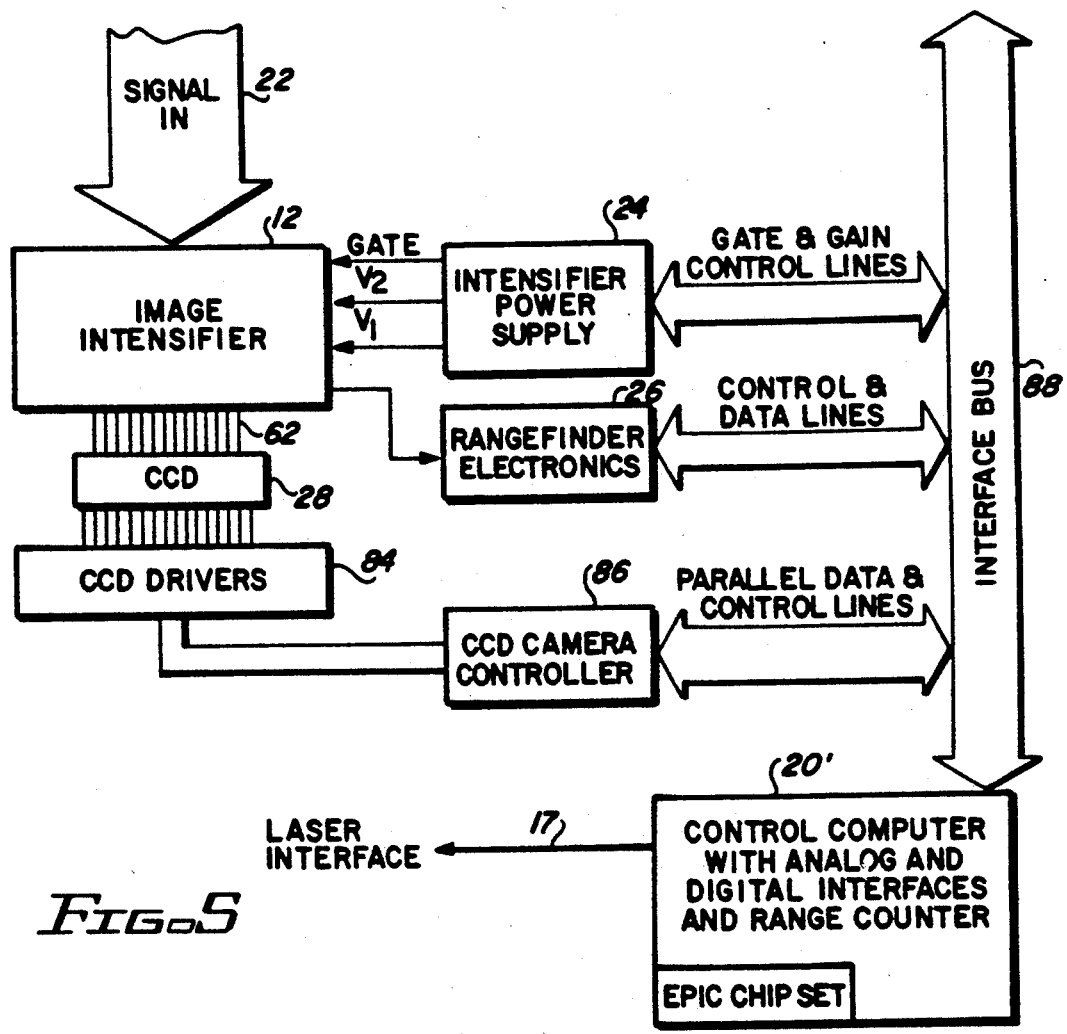
FIG. 5 shows a block diagram of the electronic circuits of a LIDAR receiver made in accordance with the present invention.

Referring next to FIG. 5, a block diagram of one embodiment of the electronic circuits of a unified LIDAR imaging and ranging system made in accordance with the present invention is illustrated. The embodiment shown in FIG. 5, as well as in FIGS. 6A and 6B below, is intended for an airborne or space application, where the mass, volume, and power requirements of the LIDAR system must to be kept as low as possible. Many of the components shown in FIG. 5 are the same as have been previously described in connection with FIGS. 1 or 2, and corresponding reference numerals are used to identify such components.

The power supply 24 provides the requisite bias voltages to the image intensifier 12. The supply 24 gates the photocathode with a minimum width of 100 nanoseconds. The bias voltage $V_1$ is controlled so that it can be adjusted in real time. The power supply 24 is further integrated with the range circuitry 26, a CCD camera controller 86, and a control computer 20' over an interface bus 88. The computer 20' performs the same function as the control circuit 20 shown in FIG. 1. By integrating the power supply 24 with the range circuitry 26 and the CCD camera controller 86, the bias voltage can be adjusted in real time as required in order to optimize the image and range signals.

The CCD 28 is, for the embodiment shown in FIG. 5, a 128×128 pixel device. A larger device, such as the Thomson TH7895A, a 512×512 device, could also be used. Advantageously, the CCD can be "binned" so as to produce whatever pixel size is desired. The output for the CCD 28 is coupled through CCD drivers 84 to the CCD camera controller 86. In general, the CCD drivers will convert the analog signals available at each pixel to a digital signal using a suitable analog-to-digital converter (ADC). A preferred ADC is a twelve bit device, which when used enhances the dynamic range of the CCD camera. A suitable ADC is the AD671 available from Analog Devices of Norwood, Mass. The AD671 advantageously offers a $2 \times 10^6$ sample conversion speed with 500 mW of power consumption, packaged in a 24 pin dual-inline package (DIP). Hence, the requirements for low volume, mass and power consumption are not compromised. Assuming a 128×128 pixel CCD, the total conversion time is 8.2 msec., thus making a 60 Hz frame readily achievable.

The control computer 20' for the embodiment shown in FIG. 5, is an 8 bit, 8080 type microprocessor. Included with the microprocessor are suitable controllers that contain digital-to-analog converters (DAC's) for analog control, buffered outputs for digital triggers and data I/O, an application specific integrated circuit (ASIC) for range counting, and a communications chip set for communication purposes. It is noted that a suitable ASIC, configured to perform the necessary range counting and interface, is commercially available from Simrad Optotronics, sold in the United Sates by Kigre Corp. of Hilton Head, N.C. A suitable communications chip set is commercially available from numerous sources, such as ACTEL or EPIC.

Figure 6A:
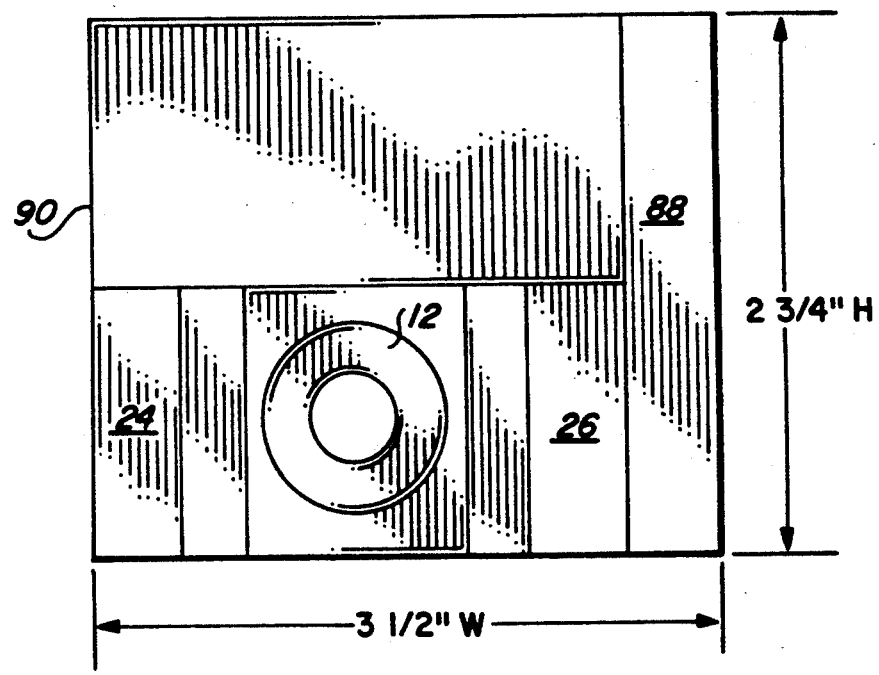
FIGS. 6A and 6B illustrate front and top views, respectively, of a preferred hardware layout of one embodiment of a LIDAR receiver and system made in accordance with the invention.
Figure 6B:
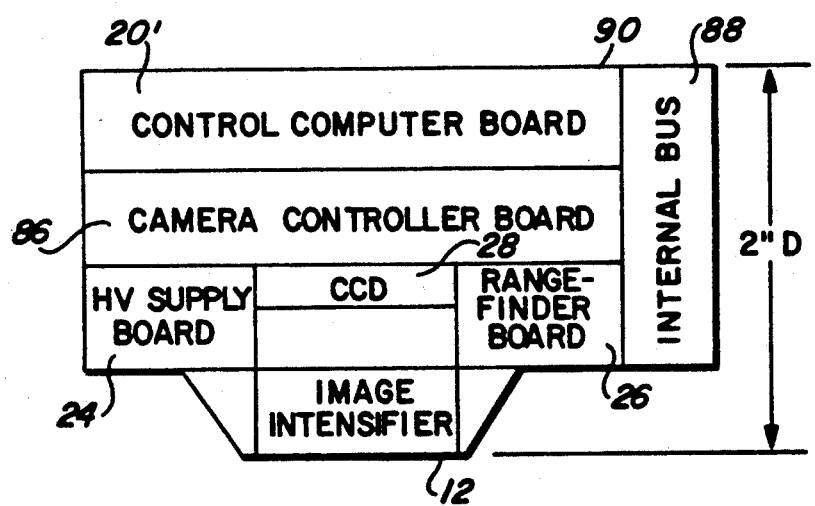

An integrated imaging and ranging LIDAR system as described above in FIG. 5 may be housed in a compact housing 90 as shown in FIGS. 6A and 6B. FIG. 6A shows a front view, and FIG. 6B shows a top view of the housing. 90. The same reference numerals as are used in FIG. 5 for the various components of the system are also used in FIGS. 6A and 6B. Advantageously, the arrangement of the components within the housing 90 provides an extremely compact size, having a width W of about 3¼ inches (8.9 cm), a height of about 2¾ inches (7 cm), and a depth of about 2 inches (5.1 cm). The LIDAR receiver (image intensifier) 12 and CCD 28 are mounted together and placed toward the edge of the unit. The boards for each particular function are stacked around the intensifier and CCD. The dimensions shown may be changed within a reasonable aspect ratio in order to accommodate any particular mounting arrangement. The power dissipation, mass, surface area, and volume of each board (assuming a two-sided PC board) are shown in Table 1.

TABLE 1

| Component | Board Area (in²) | Board Volume (in³) | Power Consum (W) | Mass (g) |
|---|---|---|---|---|
| Systm Cntrl 20' | 8 | 4 | 3.5 | 60 |
| Rangefinder 26 | 4 | 2 | 1.7 | 40 |
| CCD Camera 28 | 8 | 4 | 5.5 | 70 |
| Rcvr 12 & PS 24 | 2 | 2 | 0.5 | 75 |
| Interconnections |   | 3 |   | 20 |
| TOTAL | 22 | 15 | 11.3 | 265 |

It is noted that the total board volume shown in Table 1 is a few cubic inches less than the total housing volume shown in FIGS. 6A and 6B. This is because of some dead space which necessarily results when the components are placed in the housing 90.

Appendix A, attached hereto and incorporated herein by reference, provides a mathematical description of the unified ranging and imaging LIDAR system of the present invention, including the overall laser radar equation, the effects of system noise, and the achievable ranging accuracy for one particular application of the present invention. Such application is the tracking of a rocket having a plume. Both FIGS. 7 and 8 are referenced in Appendix A.

As described above, it is thus seen that the present invention provides a LIDAR system or method that provides ranging and imaging information using a single detection element. Advantageously, such single detection element employs only a single optical path, thereby minimizing the mass, size and power requirements of the system.

As further described above, it is seen that the invention provides a unified LIDAR system that generates both imaging and ranging output signals from the receipt of a single optical return pulse. This is made possible by a compact design that incorporates an image intensifier, having a photocathode, multichannel plate electron magnifier, and phosphor anode screen overlying an optical fiber window, with a metalized layer overlying the phosphor anode screen. The metalized layer advantageously provides a means for readily detecting a prompt anode current, which prompt anode current is generated simultaneously with the return of the optical return pulse.

As also seen from the above, the present invention biases the anode and cathode such that the anode is maintained at ground potential, thereby facilitating the detection of the anode current using a transimpedance amplifier referenced at zero or ground potential.

Additionally, it is seen that the invention provides a unified LIDAR receiver that provides significantly improved sensitivity with respect to both imaging and ranging functions compared to the sensitivity of LIDAR receivers of the prior art. One of the factors that makes such improved sensitivity possible is the avoidance of the use an avalanche photodiode detector.

While the invention herein disclosed has been described by means of specific embodiments and applications thereof, numerous modifications and variations could be made thereto by those skilled in the art without departing from the scope of the invention set forth in the claims.

APPENDIX A

Laser Radar Equation

Starting with the transmitter, the angular distribution of a Gaussian beam is given by:

$$J(\alpha_x,\alpha_y,t)=(\Phi_L(t)/2\pi\Theta_L^2)\exp(-(\alpha_x^2+\alpha_y^2)/2\Theta_L^2).$$

A glossary of symbols is appended. At large distances, the target is small with respect to the beam diameter, making the beam power distribution at the target nearly flat. For a 0th order calculation, the displacement angles from the beam axis $\alpha_x$ and $\alpha_y$ are zero. The solid angle subtended by a target is given by:

$$\Omega=4A_t/\pi R^2.$$

The total flux at the target is then:

$$\Phi_t(t)=J(0,0,t)\Omega$$

$$\Phi_t(t)=2A_t\Phi_L(t)/\pi^2\Theta_L^2 R^2.$$

If the target is modeled as a Lambertian reflector with reflectivity of $\sigma_t$ radiating into a half sphere of $2\pi$ steradians, the total received flux to the detector is:

$$\Phi_d(t)=\sigma_t\Phi_t A_t T_{eff}/2\pi R^2$$

$$\Phi_d(t)=\sigma_t A_t A_r \Phi_L(t) T_{eff}/R^4\pi^3\Theta_L^2,$$

$\Phi$ where $\Phi_d(t)$ is the time dependent flux to the detector in the LIDAR receiver. Variations in this signal arise from three predominant effects. The first is due to angular wandering of the spacecraft, which gives rise to displacement angels in the laser-power distribution term. The second is the laser beam quality, which would modify the laser beam profile expression in some complicated way. The third is the spatial coherence of the beam which gives rise to target speckle as seen by the LIDAR receiver.

Representing the motion of the spacecraft as a random process, $\alpha_x$ and $\alpha_y$ are taken as random Gaussian variables. Their average and standard deviations are then 0 and $\sigma_\alpha/(2^{\frac{1}{2}})$ respectively, and if $\alpha^2=\alpha_x^2+\alpha_y^2$, the average flux to the detector follow directly as:

$$\Phi_d(t)=\sigma_t A_t A_r \Phi_L(t)$$
$$T_{eff}\exp(-(\sigma_\alpha^2)/2\Theta_L^2)/R^4\pi^3\Theta_L^2.$$

System Noise

Rangefinder system noise stems from four predominate sources. These are:

1. signal photons (photoelectron statistics), 2. background photons, 3. detector dark current, and 4. amplifier noise. Each of these noise sources can be characterized by an equivalent optical power at the detector, or noise equivalent power (NEP). NEP is the mean square noise current divided by the detectors responsivity. The total NEP is the summation of the individual NEP's. The noise current from these sources are given in table 2.

TABLE 2

| Noise Source | Mean Square Noise Current |
|---|---|
| Signal Photons | $i_{ns}^2 = 2qRP_sB$ |
| Background Photons | $i_{nb}^2 = 2qRP_bB$ |
| Dark Current | $i_{nd}^2 = 2qi_dB$ |
| Amplifier (referred to input) | specified by manufacturer |

The responsivity of the noise current R is a product of the photocathode response r, MCP gain G, and excess noise factor F. The excess noise factor is a term which characterizes the detector's deviation from Poisson statistics. The noise current responsivity is then:

$$R = G_e^2 Fr.$$

The noise terms may then be rewritten as:

$$i_{ns} = G_e(2qFrP_sB)^{\frac{1}{2}}$$
$$i_{nb} = G_e(2qFrP_bB)^{\frac{1}{2}}$$
$$i_{nd} = G_e(2qFi_dB)^{\frac{1}{2}}.$$

The total noise current is the square root of the sum of the squares of the individual noise currents. The NEP is then:

$$NEP = [\Sigma i_n^2]^{\frac{1}{2}}/rG_e$$
$$= [2qG_e^2 FrP_sB + 2qG^2 FrP_bB + 2qG^2 Fi_dB + i_{na}^2]^{\frac{1}{2}}/rG_e$$
$$= [2qG_e^2 FB[rP_s + rP_b + i_d] + i_{na}^2]^{\frac{1}{2}}/rG_e.$$

Noise Analysis for Ranging.

The bandwidth of the amplifier should match the length of the return pulse. The return pulse length is a function of the laser pulse length plus the round trip home of the depth of the target, $$\tau_{pr} = \tau_l + 2D_t/c.$$

If the laser pulse is assembled, for this discussion, to be Gaussian in shape, then the signal from the detector is:

$$I(t) \sim \exp(-0.5(t^2/a^2)).$$

The Fourier transform to frequency space is:

$$\Phi(\omega) \sim \exp(-0.5(\omega^2 a^2)).$$

Then matching the amplifier's 3 db point to the pulse 3 db point gives:

$$f(3db) = \{[-2\ln(.707)]^{\frac{1}{2}}\}/2\pi a.$$

Assuming a target with no depth and a 20 ns FWHM laser pulse $a = 8.5$ ns. Thus the appropriate frequency to maintain the pulse shape is 16 MHz.

Additional bandwidth only serves to increase wideband noise. Less bandwidth reduces the signal peak and decreases the signal to noise ratio. However, some optimization of the SNR can be achieved. For this analysis, a 20 MHz bandwidth amplifier was chosen, which has 2 pA/Hz$^{\frac{1}{2}}$ noise. With a 3 MHz high pass filter in the circuit the bandwidth is 17 MHz, resulting a wide-band amplifier noise of $8.2 \times 10^{-9}$ A.

The responsivity of a modified S-20 photocathode at 530 nm is 83 mA/watt. This corresponding to a Q.E. of 19%. The cathode dark current is $6 \times 10^{-15}$ A. Typical electron gain is $5 \times 10^4$. Evaluating the above noise terms, $$i_{ns} = G(2qFrP_sB)^{\frac{1}{2}} = P_s^{\frac{1}{2}} 5.81 \times 10^{-2} \text{ A/W}^{\frac{1}{2}}.$$

For a 20 ns laser pulse of 532 nm light, $$i_{ns} = N_s^{\frac{1}{2}} 2.50 \times 10^{-7} \text{ A/photon}^{\frac{1}{2}}$$
$$i_{nd} = G(2qFi_dB)^{\frac{1}{2}} = 1.56 \times 10^{-8} \text{ A}$$
$$i_{na} = 2.0 \times 10^{-12} \text{ A/Hz}^{\frac{1}{2}} B^{\frac{1}{2}} = 8.2 \times 10^{-9} \text{ A}.$$

Except for background noise, the dominate term is the signal noise, or photo statistics. Therefore, the rangefinder function is photon limited. In contrast to an APD, the MCP has lower dark current, lower excess noise and higher gain, making the MCP overall a more sensitive receiver.

The system NEP can now be calculated using the noise currents above. With no signal, it is just a product of the dark current and amplifier noise.

$$NEP = [(1.56 \times 10^{-8} \text{ A})^2 + (8.2 \times 10^{-9} \text{ A})^2]^{\frac{1}{2}}/(5 \times 10^4)(.083 \text{ A/W})$$
$$= 4.2 \times 10^{-12} \text{ W}.$$

For a 20 ns FWHM pulse, this is less than one photon, and, as pointed out before, this system is photon limited. Considering just photon statistics, and assuming a minimum SNR of 5, the resulting minimum signal is:

$$P_s = 5 \text{ NEP}$$
$$= 5[P_s^{\frac{1}{2}} 5.81 \times 10^{-2} \text{ A/W}^{\frac{1}{2}}]/(5 \times 10^4)(.083 \text{ A/W})$$
$$= 0.49 \text{ nW}.$$

For a 20 ns pulse, this corresponds to ~26 photons. From the 0th order power analysis above, the received flux is:

$$\Phi_d(t) = \sigma_t A_t A_r \Phi_L(t) T_{eff}/R^4 \pi^3 \Theta_L^2.$$

If the transmit and received power are known, the range can be found from:

$$R = [\sigma_t A_t A_r \Phi_L(t) T_{eff}/\pi^3 \Theta_L^2 \Phi_d(t)]^{\frac{1}{4}}.$$

If laser energy and pulse length are 100 mJ and 20 ns respectively, the average power is 5 MW, the peak power is then 10 MW. For a 1 mrad beam, defined in conventional terms of full angle between 1/e points, $\Theta_L = 1$ mrad $/2\sqrt{2} = 0.282$ mrad. If a 0.49 nW pulse is the minimum signal, then the maximum range is:

$$R_{max} = [(.1)(3 \text{ m}^2)(4.4 \times 10^{-3} \text{ m}^2)(10 \text{ MW})(.5)/\pi^3(.00028 \text{ rad})^2(0.49 \times 10^{-9} \text{ W})]^{\frac{1}{4}}$$
$$= 48.3 \text{ Km}.$$

To consider the effect of background light on the range limit, it is assumed that the rocket's plume is the largest source of background light. The plume is distant and considered a point source, with its optical emission $\xi$, in units of Watts/steradian $\mu$m. The received flux is then:

$$P_b = \xi A_r \Delta/4\pi R^2.$$

The ratio of the signal noise current to the noise current from background light is of interest in this analysis. This is simply the square root of the signal power divided by the background power, which is:

$$i_{ins}/i_{nb} = 2(\sigma_t A_t P_L T_{eff})^{\frac{1}{2}}/\pi\Theta_L(\xi\Delta)^{\frac{1}{2}} R.$$

In the green, $\xi=2500$ W/ster.$\mu$m. Nominal value for the optical bandwidth $\Delta$ is 2 nm. Using these values, $i_{ins}/i_{nb}$ is plotted in FIG. 7. The plots shown in FIG. 7 indicate that background noise is at least 1/25 of the signal shot noise at relevant ranges, and that signal photo statistics are still the limiting factor.

Ranger Accuracy

Rangefinder circuitry accuracy is a function of its noise and bandwidth. The uncertainty in time when a threshold value is crossed depends on the noise in the circuit and the pulse rise time as shown in FIG. 3.

The slope of the leading edge is:

$$slope = A/T_T,$$

where $T_T$ is the risetime of the pulse, and $$\Delta T_r = n(t)/A/T_T$$
$$= T_T/(A/n(t)).$$

Finding the mean value:
$$(\Delta T_r^2)^{\frac{1}{2}} = T_T/(A^2/n^2(t))$$

$T_T$ is the reciprocal of the bandwidth. $A^2/n^2(t)$ is half the power signal to noise ratio ($SNR_p$). For direct detection, sed here, $$SNR_p = ]SNR[^2.$$

The range error is a product of this mean time and the speed of light divided by two (round trip speed). Thus:

$$\text{Range error} = c/2B[SNR]^2.$$

For the SNR of 5 used above, and 17 MHz bandwidth, the range error is 0.35 meters.

Imager Analysis

In the imager, there are three major noise sources. These are signal noise, intensifier dark current, and CCD noise. Since the imager is a framing device composed of individual pixels, this analysis will be set in that context.

The noise of the CCD camera, referred to the intensifier input, is:

$$p_d^2 = [q_1/\epsilon_c \eta \eta_{ccd} G_p]^2.$$

The dark level noise of the intensifier is the fluctuation in the equivalent background illumination. This is:

$$p_i^2 = [EBI \ \tau_g/A_p w_p].$$

The signal noise is determined from Poisson statistics, so:

$$p_s^2 = [w_s \eta/w_p].$$

Photocathode photon noise equivalent is the square root of the sum of the above terms.

$$N.E.\text{phot.} = \{[q_o/\eta\eta_{ccd}G_p\epsilon_c]^2 + [EBI$$
$$\tau_g A/p/w_p[ = [w_s\eta/w_p]\}^{\frac{1}{2}}.$$

Conservative parameters are: $\eta=0.1$, $\eta_{ccd}=0.25$, $EBI=1.5\times10^{-15}$ W/cm$^2$, $\tau_g=10$ $\mu$s, $A_p=2.5\times10^{-5}$ cm$^2$, $w_p=3.7\times10^{-19}$, $q_1=100$ e-, and $\epsilon_c=0.5$. we find:

$$N.E.\text{phot.} = \{1.8 \times 10^7/G_p^2 + 1 \times 10^{-6} + [.1 \ N_p]\}^{\frac{1}{2}}$$
$$= \{1.6 + 10^5/G_e^2 + 1 \times 10^{-6} + [.1 \ N_p]\}^{\frac{1}{2}}.$$

In the above expression, the middle term is negligible. The significant terms are the CCD noise and the photon noise. If the gain G is large enough, the camera becomes photon limited. The limit here is actually photoelectrons. Using a normal low-resistance photocathode tube, the photon limit is 10 photons with a standard 10% quantum efficiency. For photon limited imaging, $N_p=10$, and $G_p>1260$. A single stage MCP image intensifier has electron gain on the order of 2K, which would appear to make the imager photon limited. However, this is only marginal. When the return pulse to the photocathode is much shorter than the rise time of the phosphor, as is probably the case for a 20 ns pulse, the actual luminous gain is less than the DC luminous gain which is usually quoted. With a dual plate image intensifier, gains are greater than 250K, and the imager is certainly photon limited. This agrees with data taken at General Atomics with the LLNL BP camera system.

For the imaging system, because backgroundsubtraction is not used, the limiting factor for image utility is the contrast between the plume and the hardbody return. For the best result, the contrast should be significantly greater than 1. The contrast C is the ratio of the signal photons to the background photons is:

$$C = N_s/N_b$$

$$C = 4\sigma_t A_t P_L T_{eff}/\pi^2\Theta_L^2 \xi\Delta t_g R^2.$$

This is plotted in FIG. 8.

As in the case of the ranger, the contrast ratio of plume's emission to laser signal is significantly greater than 1 at relevant ranges. The signal shot noise is still the greatest noise term.

The background is assumed to be predominantly from the plume, but if the interceptor is facing earth, scattered light could constitute significantly. However, this analysis is beyond the scope of this report.

Imager Position Accuracy

Imager accuracy is dependent on the software that is used to analyze the data. If hardbody reflectivity ($\rho_h$) is greater than that of the plume, simple centroiding will easily work. Centroiding is straight forward to implement, fast, and has a large dynamic range because the intensifier can bloom without loss of accuracy. We have performed experiments at GA with the LLNL intensified-CCD camera taking the photocathodes to destruction, and have observed 8 orders of magnitude of dynamic range with centroiding. However, we need data on plume $\rho$vs. hardbody $\rho$ to write any software.

Assuming centroiding will work in this application, it has been found that centroiding can be used to give sub-pixel positioning accuracy for images extending over several pixels. If centroiding accuracy is in fractions of pixel, $A_c$, system resolution is then:

Resolution = $(A_c)$(f.o.v)/#pixel.

Values for $A_c$ can approach ~0.2 under the proper conditions. For conservative design practices, $A_c$ is taken as unity. Once the resolution has been selected and number of pixels are known, pixel size can be determined.

Pixel size = (f.o.v.)fl/#pixel

It is best to maintain a small image w.r.t. pixel size in order to keep image SNR high at low (distant) signal levels. However, the hardbody image needs to extend over several pixel at the finish to separate it from the plume and get accurate position data.

Pixel angular resolution is specified as 50 μrad. The entire f.o.v. For the LIDAR is specified as 5 mrad, which is 5× greater than the laser beam divergence. The minimum number of pixels is then 100. Pixels should be kept as large as possible in order to utilize the highest MTF of the intensifier. The maximum pixel size is 84 μm for a 100×100 array (12 mm diagonal) or 66 82 m for a 128×128 device.

Ranger and Imager Dynamic Range

It has been shown in the previous analysis, that both the ranger and imager are photon limited. The upper limit for this system is the damage threshold of the photocathode. Damage threshold is a function of pulse energy density and repetition rate, or average photocathode current. Tests at General Atomics on S-20 photocathodes indicate a damage threshold, as measured with very short, laser-length pulses, of $1.5 \times 10^{-4}$ Amp/cm$^2$ of photocathode current.

When an image is less than the blur circle of the optics, the blur circle is then the image. For the 22 cm focal length and a 2 meter diameter target, the image size is less than the blur circle when R>18.3 km. When R<18.3 km, using the 60 Hz maximum repetition rate of the laser, damage will occur with pulses of greater than $3 \times 10^8$ photons. Using this limit, 7 orders of magnitude of dynamic range are predicted.

At 100 meters, the image size is ~0.2 cm$^2$. The damage threshold with this size image is $1.3 \times 10^{13}$ photons/pulse at 60 Hz. Therefore, for the entire engagement, the dynamic range is as high as $10^{12}$.

What is claimed is:

1. An integrated LIDAR receiver comprising:
   an image intensifier having an opaque cathode; an anode spaced apart from the cathode; a microchannel plate (MCP) electron multiplier positioned intermediate the cathode and anode; and a phosphor film deposited on a fiber optic substrate on said anode, said phosphor film being coated with a metalized layer;
   power supply means for applying a first voltage potential between said MCP and said anode, with said anode being substantially at ground potential, and for selectively applying a second voltage potential between said MCP and said cathode;
   amplifier means coupled to said metalized layer of said anode for converting pulses of electrical current detected at said metalized layer to voltage pulses; and
   threshold detection means for detecting when the voltage pulses generated by said amplifier means exceed a prescribed threshold level;
   whereby optical pulses striking said cathode are manifested by the emission of electrons, which electrons are multiplied, and accelerated towards said anode, with a fraction of the electrons striking said anode passing through said metalized film into the phosphor film, causing photons to be emitted in proportion to the energy of the electrons, said photons passing through said fiber optic substrate; and with a remaining fraction of the electrons striking said anode serving as a prompt electron current within said metalized layer, which prompt electron current is converted to a voltage pulse by said amplifier means, and detected as a valid optical return pulse when said voltage pulse exceeds said prescribed threshold level.

2. The integrated LIDAR receiver as set forth in claim 1 wherein the first voltage potential is selected so that the metalized layer absorbs a prescribed amount of the energy of an electron beam that strikes said anode, with the balance of the energy of said electron beam being transferred to said phosphor film and being converted to photons, the energy of said electron beam being determined by the first voltage potential applied between said MCP electron multiplier and said anode, said first voltage potential being selected so that the metalized layer absorbs between approximately 2–5 KeV of energy.

3. The integrated LIDAR receiver as set forth in claim 2 further including an imaging sensor optically coupled to said fiber optic substrate, whereby photons passing through said fiber optic substrate may be sensed by said imaging sensor and converted to appropriate imaging signals representative of an optical signal, thereby providing imaging information.

4. The integrated LIDAR receiver as set forth in claim 2 further including electronic timer means for timing a time interval between a start signal and a stop signal, and wherein said start signal comprises a trigger signal that triggers the generation and transmission of an optical pulse towards a target, and said stop signal comprises a valid optical return pulse detected by said threshold detection means whenever the voltage pulse generated by said amplifier means exceeds said prescribed threshold level; whereby said time interval provides a measure of the propagation time of said optical pulse to and from said target, from which propagation time the distance between said LIDAR receiver and said target may be calculated, thereby providing range information.

5. The integrated LIDAR receiver as set forth in claim 1 wherein said metalized layer comprises Al or Be.

6. The integrated LIDAR receiver as set forth in claim 1 further including a metalized undercoating layer placed on said cathode.

7. The integrated LIDAR receiver as set forth in claim 1 wherein said power supply means selectively generates a third voltage potential to replace said second voltage potential, said third voltage potential having a polarity opposite that of said second voltage potential, said third voltage potential when applied between said cathode and MCP electron multiplier causing said image intensifier to be gated off.

8. A LIDAR system for providing ranging and imaging information relative to a target, said LIDAR system including:
   (1) means for generating and directing a pulse of radiant energy having a known wavelength towards said target in response to a trigger signal;

(2) a integrated LIDAR receiver for receiving radiant energy of said known wavelength reflected from said target, said integrated LIDAR receiver comprising:
  (a) a cathode spaced apart from an anode, electrons being emitted by said cathode in response to said cathode being impinged by radiant energy reflected from said target;
  (b) electron multiplier means positioned intermediate the cathode and anode for receiving the electrons emitted from the cathode, and emitting a larger number of electrons than received, and
  (c) said anode comprising a first layer of a first selected material overlaying a fiber optic substrate, and a second layer of a second selected material overlaying said first layer; a fraction of the electrons striking said anode passing through said second layer and being converted to photons in said first layer, said photons thereafter being detectable through said fiber optic substrate; and a remaining fraction of the electrons striking said anode remaining in said second layer and being detectable as a prompt anode current;
(3) power supply means for selectively applying a first voltage potential between said MCP electron multiplier and said anode of said LIDAR receiver, and for selectively applying a second voltage potential between said MCP and said cathode; said second voltage potential causing electrons emitted by said cathode to be accelerated towards said MCP electron multiplier, and said first voltage potential causing electrons emitted by said MCP electron multiplier to be accelerated towards said anode with a prescribed energy;
(4) detection means for detecting said prompt anode current and generating a return signal when the detected prompt anode current exceeds a prescribed threshold level;
(5) timing means for measuring the elapsed time between said trigger signal and said return signal;
(6) an image sensor coupled to said fiber optic substrate for generating an image signal responsive to photons impinging said image sensor through said fiber optic substrate; and
(7) processing means for generating said trigger signal, processing said image signal, and computing a range indication from the elapsed time measured by said timing means, whereby both image and range information are provided relative to said target by detecting radiant energy of said known wavelength reflected from said target through said integrated LIDAR receiver.

9. The LIDAR system as set forth in claim 8 wherein said power supply means applies said first voltage potential between said anode and said electron multiplier means so as to maintain said anode at a substantially zero or ground potential.

10. The LIDAR system as set forth in claim 9 wherein said power supply means further includes means for selectively applying a third voltage potential in lieu of said second voltage potential between said electron multiplier means and said cathode, said third voltage potential being of an opposite polarity than said second voltage potential, said third voltage potential when applied causing said integrated LIDAR receiver to be biased off.

11. The LIDAR system as set forth in claim 8 wherein the first material of the first layer of said anode includes phosphor.

12. The LIDAR system as set forth in claim 8 wherein the second material of the second layer of said anode includes at least one of the metals Al or Be.

13. The LIDAR system as set forth in claim 8 wherein the first voltage potential is selected so that the second layer absorbs a portion of the energy of an electron that strikes said anode, with the balance of the energy being transferred to said first layer and being converted to photons.

14. The LIDAR system as set forth in claim 13 wherein said first voltage potential is selected so that the second layer absorbs between approximately 2 to 5 KeV of electron energy.

15. The LIDAR system as set forth in claim 8 wherein said detection means comprises
  a transimpedance amplifier that converts said prompt anode current to a voltage signal, and
  a threshold detector that compares the voltage signal generated by said transimpedance amplifier to a reference voltage level and generates said return signal only when said voltage signal pulse exceeds said reference voltage level.

16. The LIDAR system as set forth in claim 15 wherein said power supply means maintains said anode at a substantially zero potential, whereby said transimpedance amplifier operates about a substantially null input.

17. The LIDAR system as set forth in claim 15 further including a power supply gate circuit that generates a gate signal for controlling said power supply means, said gate signal enabling said power supply means a prescribed time $T_E$ after the generation of said pulse of radiant energy, and disabling said power supply means a time $T_S$ after the leading edge of said return signal.

18. The LIDAR system as set forth in claim 17 wherein the time $T_S$ is 5–10 nanoseconds.

19. A method of determining both image and range information relative to a target using a single LIDAR detector, said LIDAR detector including a cathode spaced apart from an anode, with electrons being emitted by the cathode in response to the cathode being impinged by radiant energy reflected from said target; and with said anode including a phosphor layer covered with a metalized layer, said method comprising the steps of:
  (a) generating a pulse of radiant energy having a known wavelength and directing said radiant energy pulse at said target;
  (b) receiving radiant energy reflected from said target of said known wavelength at the cathode of said LIDAR receiver;
  (c) biasing said anode relative to said cathode of said LIDAR receiver such that electrons emitted from said cathode in response to the radiant energy received in step (b) are accelerated towards said anode with a prescribed energy, said prescribed energy being selected such that a fraction of the electrons striking said anode pass through said metalized layer into said phosphor layer and cause photons to be emitted, and a remaining fraction of the electrons striking said anode remain in said metalized layer and are detectable as a prompt anode current;

(d) detecting the photons generated in said phosphor layer and producing an image signal therefrom;

(e) detecting the prompt anode current in said metalized layer;

(f) measuring the elapsed time between the generation of the radiant energy pulse in step (a) and the detection of the prompt anode current in step (e); and (g) calculating the distance to the target based upon the elapsed time measurement of step (f).

20. The method as set forth in claim 19 wherein step (c) includes biasing said anode so as to be at ground (zero) potential.

21. The method as set forth in claim 20 further including multiplying the number of electrons emitted from said cathode of said LIDAR receiver prior to having said electrons strike said anode.

22. The method as set forth in claim 21 wherein the step of multiplying the number of electrons emitted from said cathode comprises inserting a multichannel plate (MCP) electron multiplier between said cathode and anode.

23. The method as set forth in claim 19 further including biasing said cathode to not detect photons a prescribed time $T_S$ after detecting the prompt anode current in step (e)

* * * * *

UNITED STATES PATENT AND TRADEMARK OFFICE
CERTIFICATE OF CORRECTION

PATENT NO. : 5,198,657

DATED : 3/30/93

INVENTOR(S) : Trost, et al

It is certified that error appears in the above-indentified patent and that said Letters Patent is hereby corrected as shown below:

Column 13, line 40, after "$V_T$" insert a space. Column 20, line 42, Appendix A, delete the first occurrence of "$\Phi$". Column 20, line 47, change "angels" to --angles--. Column 22, line 9, change "$A/W^{178}$" to --$A/W^{½}$--. Column 22, line 18, change "photo" to --photon--. Column 23, line 13, change "photo" to --photon--. Column 23, line 35, change "]SNR[$^2$" to --[SNR]$^2$--. Column 24, lines 1-2, change "N.E. Phot. = $\{[q_a/\eta\eta ccdG_p\epsilon_c]^2+[EB1]\tau_g A/_p/wp[=[w_s\eta/w_p]\}^{½}$" to --N.E. Phot. = $\{[q_1/\eta\eta ccdG_p\epsilon_c]^2+[EB1]\tau_g A_p/wp]=[w_s\eta/w_p]\}^{½}$--. Column 24, line 48, change "constitute" to --contribute--. Column 25, lines 21-22, change "66 82 m" to --66 µm--. Column 25, lines 45 and 46, after "is as high as $10^{12}$" but before "what is claimed is", insert the Glossary shown on page 2 of 2 of this Certificate. Column 25, line 55, Claim 1, after "for" insert --selectively--.

UNITED STATES PATENT AND TRADEMARK OFFICE
CERTIFICATE OF CORRECTION

PATENT NO. : 5,198,657
DATED : 3/30/93
INVENTOR(S) : Trost, et al

It is certified that error appears in the above-indentified patent and that said Letters Patent is hereby corrected as shown below:

Glossary

| Symbol | Description | Units |
|---|---|---|
| $A_c$ | Centroiding accuracy | |
| $A_p$ | Pixel area | cm² |
| $A_r$ | Receiver aperture area | m² |
| $A_t$ | Target cross sectional area | m² |
| $\alpha_x, \alpha_y$ | Laser angular displacements | radians |
| B | Amplifier bandwidth | MHz |
| c | Speed of light $3 \times 10^8$ m/sec | |
| $D_t$ | Depth of target | m |
| $\epsilon_c$ | Fiber optic coupling efficiency | |
| $\Delta$ | Optical Bandwidth | μm |
| $\Delta T_r$ | Temporal variations from noise | sec |
| EBI | Equiv. Background illumination | W/cm² |
| F | Excess noise factor | |
| f.o.v. | Field of view | radians |
| $\phi_d$ | Flux to detector | |
| $\phi_l$ | Flux from laser | |
| $\phi_T$ | Flux incident on target | |
| f l | focal length | m |
| $G_l$ | Electron gain | e⁻/e⁻ |
| $G_p$ | Photon gain | phosphor |
| η | Intensifier quantum efficiency | |
| η_ccd | CCD quantum efficiency | |

Signed and Sealed this

Nineteenth Day of April, 1994

*Attest:*

*Attesting Officer*

BRUCE LEHMAN

*Commissioner of Patents and Trademarks*